US010419982B1

(12) United States Patent
Gundavelli et al.

(10) Patent No.: US 10,419,982 B1
(45) Date of Patent: Sep. 17, 2019

(54) METHODS AND APPARATUS FOR PROVIDING END MARKER FUNCTIONALITY IN MOBILE NETWORKS HAVING SRV6-CONFIGURED MOBILE USER PLANES

(71) Applicant: Cisco Technology, Inc., San Jose, CA (US)

(72) Inventors: Srinath Gundavelli, San Jose, CA (US); Sangram Kishore Lakkaraju, Bangalore (IN); Timothy Peter Stammers, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/921,533

(22) Filed: Mar. 14, 2018

(51) Int. Cl.
*H04W 36/00* (2009.01)
*H04W 36/02* (2009.01)
*H04L 12/911* (2013.01)
*H04L 12/721* (2013.01)

(52) U.S. Cl.
CPC ......... *H04W 36/0033* (2013.01); *H04L 45/34* (2013.01); *H04L 47/825* (2013.01); *H04W 36/023* (2013.01)

(58) Field of Classification Search
CPC .. H04W 36/0033; H04W 36/023; H04L 45/34
USPC ........................................................ 370/331
See application file for complete search history.

(56) References Cited

U.S. PATENT DOCUMENTS

2012/0252355 A1* 10/2012 Huang .............. H04W 36/0033
455/7

2015/0124622 A1   5/2015 Kovvali et al.
2015/0244537 A1*  8/2015 Paquette ................. H04W 4/24
370/259
2015/0256456 A1   9/2015 Previdi et al.
2015/0382240 A1  12/2015 Hecht et al.
(Continued)

FOREIGN PATENT DOCUMENTS

CN        106912012 A    6/2017
EP         3113539 A1    1/2017

OTHER PUBLICATIONS

C. Filsfils et al., "Segment Routing Architecture, draft-ietf-spring-segment-routing-14" Network Working Group-Internet Draft, Dec. 20, 2017, pp. 1-31.

(Continued)

*Primary Examiner* — Stephen J Clawson

(57) ABSTRACT

End marker functionality may be provided in mobile networks having mobile user planes configured with segment routing for IPv6 (SRv6), especially suitable for 5G network migration. For example, a base station may receive an SRv6 control message from a user plane function (UPF) which carries data traffic of a data session for the UE. The base station may perform a function associated with a segment identifier (SID) identified in a segment routing header (SRH) of the SRv6 control message. The function may be an end marker handling function associated with an end marker SID. Performing the end marker handling function may cause the base station to generate a tunneling protocol message (e.g. according to GPRS tunneling protocol or GTP) comprising an end marker message and send the tunneling protocol message comprising the end marker message for receipt by the target base station.

20 Claims, 24 Drawing Sheets

(56) References Cited

U.S. PATENT DOCUMENTS

| | | | |
|---|---|---|---|
| 2017/0126618 A1 | 5/2017 | Bhaskaran et al. | |
| 2017/0245184 A1* | 8/2017 | Nagesh Shetigar | H04J 11/00 |
| 2017/0250908 A1 | 8/2017 | Nainar et al. | |
| 2017/0359768 A1* | 12/2017 | Byun | H04W 8/06 |
| 2017/0367026 A1 | 12/2017 | Li et al. | |
| 2018/0115928 A1* | 4/2018 | Kim | H04W 36/0061 |
| 2018/0192337 A1* | 7/2018 | Ryu | H04W 36/0066 |
| 2018/0199398 A1* | 7/2018 | Dao | H04W 36/14 |
| 2018/0317137 A1* | 11/2018 | Loehr | H04L 1/1614 |
| 2018/0324631 A1* | 11/2018 | Jheng | H04W 28/0263 |
| 2018/0376384 A1* | 12/2018 | Youn | H04W 36/00 |

OTHER PUBLICATIONS

C. Filsfils et al., "SRv6 Networking Programming-draft-filsfils-spring-srv6-network-programming-03", SPRING-Internet Draft, Dec. 21, 2017, pp. 1-50.

S. Matsushima et al., "Segment Routing IPv6 for Mobile User-Plane, draft-ietf-dmm-srv6-mobile-uplane-00", SPRING and DMM-Internet Draft, Nov. 30, 2017, pp. 1-20.

'LTE X2 Handover', NMC Consulting Group, pp. 1-2.

"Universal Mobile Telecommunications System (UMTS); LTE; General Packet Radio System (GPRS) Tunnelling Protocol User Plane (GTPv1-U) (3GPP TS 29.281 version 9.3.0 Release 9)", ETSI TS 129 281, V9.3.0 (Jun. 2010), pp. 1-26.

Michael Mitzenmacher, "The Power of Two Choices in Randomized Load Balancing", IEEE Transactions on Parallel and Distributed Systems, vol. 12, No. 10, Oct. 2001, 11 pages.

C. Filsfils, et al., "IPv6 Segment Routing Header (SRH)", draft-ietf-6man-segment-routing-header-14, Network Working Group, Internet-Draft, Jun. 28, 2018, 29 pages.

Y. Desmouceaux, et al., "SRLB: The Power of Choices in Load Balancing with Segment Routing", 2017 IEEE 37th International Conference on Distributed Computing Systems, Jun. 5-8, 2017, 6 pages.

3GPP, "3rd Generation Partnership Project; Technical Specification Group Services and System Aspects; Procedures for the 5G System; Stage 2 (Release 15)," 3GPP TS 23.502 V15.0.0, Technical Specification, Dec. 2017, 258 pages.

3GPP, "3rd Generation Partnership Project; Technical Specification Group Services and System Aspects; System Architecture for the 5G System; Stage 2 (Release 15)," 3GPP TS 23.501 V15.0.0, Technical Specification, Dec. 2017, 181 pages.

* cited by examiner

Partial srv6 replacement / upgrade ← 730

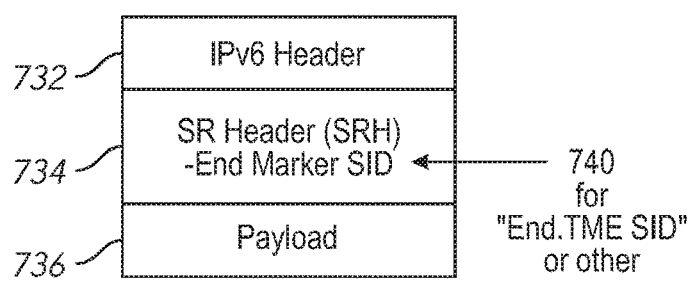

732 — IPv6 Header
734 — SR Header (SRH) -End Marker SID ← 740 for "End.TME SID" or other
736 — Payload

*FIG. 7A*

Non-routable EndMarker SID

When interworking node N receives a packet destined to S and S is a local End.TME SID ← 710

```
1. IF NH = SRH and SL==1
2.     Stop receiving downlink packets for SRH [SL]
3.     EndMarkerSID = SRH [SL]
4.     Construct EndMarker packet using EndMarkerSID
5.     Push header of TUN-PROTO with tunnel ID from S
6.     Push outer IPv4 header with SA, DA from S
7. ELSE
8.     Drop the packet
```

*FIG. 7B*

Routable SID along with the non-routable EndMarker SID

When interworking node N receives a packet destined to S and S is a local End.TME SID, N does: ← 720

```
1. IF NH = SRH and SL > 0 and SRH [SL] & NOTENDMARKER
2.     Decrement SL
3.     Update the IPv6 DA with SRH [SL]
4.     Push header of TUN-PROTO with unnel ID from S
5.     Push outer IPv4 header with SA, DA from S
6. ELSE IF NH = SRH and SRH [SL] & ENDMARKER and SL == 2
7.     Stop receiving downlink packets for SRH [SL]
8.     Decrement SL
9.     EndMarkerSID = SRH [SL]
10.    Construct EndMarker packet using EndMarkerSID
11.    Push header of TUN-PROTO with tunnel ID from S
12.    Push outer IPv4 header with SA, DA from S
13. ELSE
14.    Drop the packet
```

*FIG. 7C*

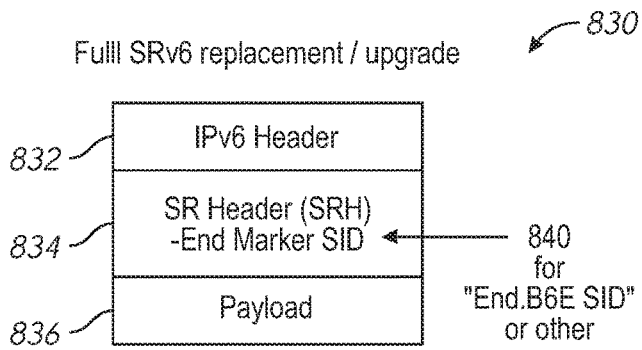

FIG. 8A

Non-routable EndMarker SID
When N receives a packet destined to S and S is a local End.B6E SID N does: — 810

```
1. IF NH = SRH and SL==1
2.    Stop receiving downlink packets for SRH [SL]
3.    EndMarkerSID = SRH [SL]
4.    Construct EndMarker packet using EndMarkerSID -- Ref1;
5.    Insert new SRH
6.    Set the IPv6 DA to the first segment of the SRv6 policy
7.    Forward according to the first segment of the SRv6 policy
8. ELSE
9.    Drop the packet
```

Ref1: Extract TEID in EndMarker SID and construct ICMPv6 packet with new SRv6 header

FIG. 8B

Routable SID along with the non-routable EndMarker SID
When N receives a packet destined to S and S is a local End.B6E SID, N does: — 820

```
1. IF NH = SRH and SL > 0 and SRH [SL] & NOTENDMARKER
2.    Do not decrement SL nor update the IPv6 DA with SRH [SL]
3.    Insert a new SRH
4.    Set the IPv6 DA to the first segment of the SRv6 policy
5.    Forward according to the first segment of the SRv6 policy
6. ELSE IF NH = SRH and SRH [SL] & ENDMARKER and SL == 2
7.    Stop receiving downlink packets for SRH [SL]
8.    Decrement SL
9.    EndMarkerSID = SRH [SL]
10.   Construct EndMarker packet using EndMarkerSID -- Ref1;
11.   Insert a new SRH
12.   Set the IPv6 DA to the first segment of the SRv6 policy
13.   Forward according to the first segment of the SRv6 policy
14. ELSE
15.   Drop the packet
```

Ref1: Extract TEID in EndMarkerSID and construct ICMPv6 packet with new SRv6 header

METHODS AND APPARATUS FOR PROVIDING END MARKER FUNCTIONALITY IN MOBILE NETWORKS HAVING SRV6-CONFIGURED MOBILE USER PLANES

TECHNICAL FIELD

This disclosure relates generally to providing end marker functionality in mobile networks having mobile user planes configured with segment routing (SR) for IPv6 (SRv6).

BACKGROUND

There is a need to provide end marker functionality in mobile networks having mobile user planes configured with segment routing (SR) for IPv6 (SRv6), especially suitable for 5G mobile network migration.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 7A is an illustrative representation of an SRv6 message which includes an end marker segment identifier (SID), and FIGS. 7B-7C are illustrative examples of SRv6 functions associated with the end marker SID (i.e. for end marker handling for GTP interface);

FIG. 8A is an illustrative representation of an SRv6 message which includes an end marker SID, whereas FIGS. 8B-8C are illustrative examples of SRv6 functions associated with the end marker SID (i.e. for end marker handling for SRv6 interface);

Figure 1A:
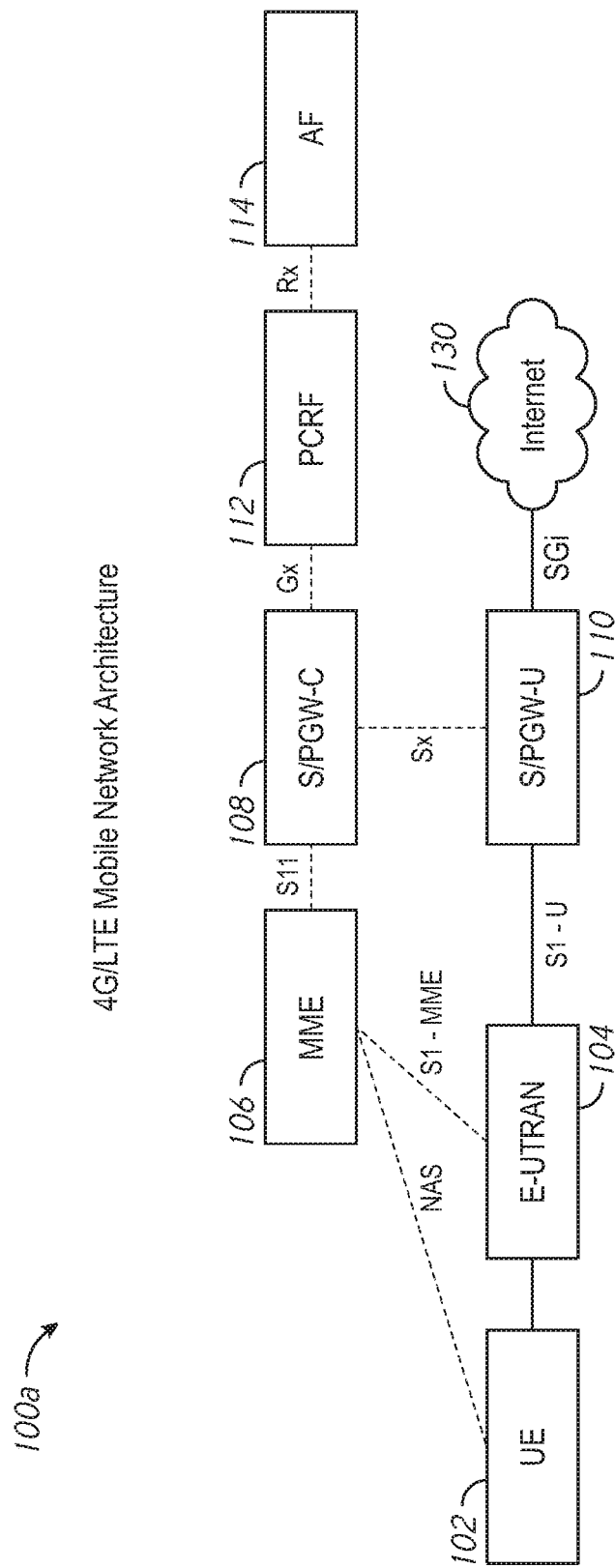
FIG. 1A is an illustrative representation of a network architecture of a 4G/LTE mobile network.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

According to the present disclosure, end marker functionality may be provided in mobile networks having mobile user planes configured with segment routing (SR) for IPv6 (SRv6), especially suitable for 5G mobile network migration.

In one illustrative example, a base station is configured for use in a mobile network and operative as a source base station for a handover of a user equipment (UE) to a target base station. The base station may receive an SRv6 control message from a user plane (UP) entity which carries data traffic of a data session for the UE. The base station may perform a function associated with a segment identifier (SID) identified in a segment routing header (SRH) of the SRv6 control message. The function may be an end marker handling function associated with an end marker SID.

When the source and target base stations are configured to communicate with each other according to a GPRS tunneling protocol (GTP) over a GTP tunnel, performing the end marker handling function may cause the base station to at least generate a tunneling protocol message comprising an end marker message and send the tunneling protocol message comprising the end marker message for receipt by the target base station. In response to receiving this end marker, the target base station may perform end marker functionality (e.g. release buffered data packets from the UP entity and transmit them to the UE).

When the source and target base stations are configured to communicate with each other according to SRv6, performing the end marker handling function may cause the base station to at least generate a new SRv6 control message including a new end marker SID and send the new SRv6 control message including the new end marker SID for receipt by the target base station. Again, in response to receiving this end marker, the target base station may perform end marker functionality (e.g. release buffered data packets from the UP entity and transmit them to the UE).

More detailed implementations for providing end marker functionality, especially suitable for 5G mobile network migration, are described in more detail below.

Example Embodiments

FIG. 1A is an illustrative representation of a network architecture 100a of a 4G/LTE mobile network. Network architecture 100a of FIG. 1A includes an evolved universal terrestrial radio access network (E-UTRAN) 104, a mobility management entity (MME) 106, a serving/packet data network (PDN) gateway-control plane entity (S/PGW-C) 108, a S/PGW-user plane entity (S/PGW-U) 110, a policy and charging rules function (PCRF) 112, and an application function (AF) 114.

A user equipment (UE) 102 may gain access to the mobile network via E-UTRAN 104, which may include a plurality of base stations, such as eNodeBs. UE 102 operating in the mobile network may be any suitable type of device, such as a cellular telephone, a smart phone, a tablet device, an Internet of Things (IoT) device, and a machine-to-machine (M2M) device, to name but a few. Communications with nodes or devices on one or more data networks, such as the Internet 130, may be provided via S/PGW-U 110.

Figure 1B:
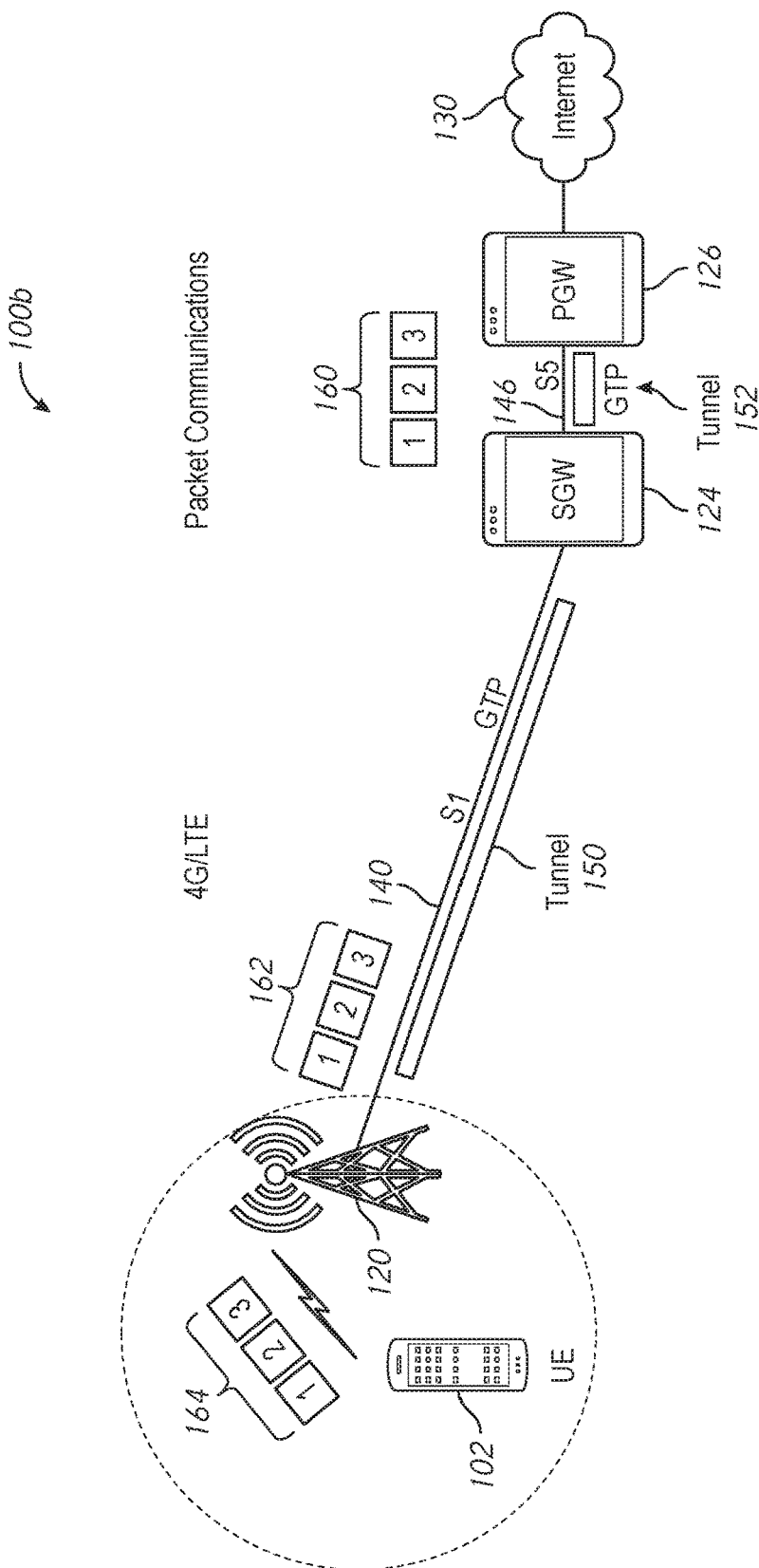
FIGS. 1B, 1C and 1D are illustrative network node diagrams of relevant network nodes of the 4G/LTE mobile network of FIG. 1A, for describing a technique for a user equipment (UE) handover which utilizes end marker functionality.
Figure 1C:
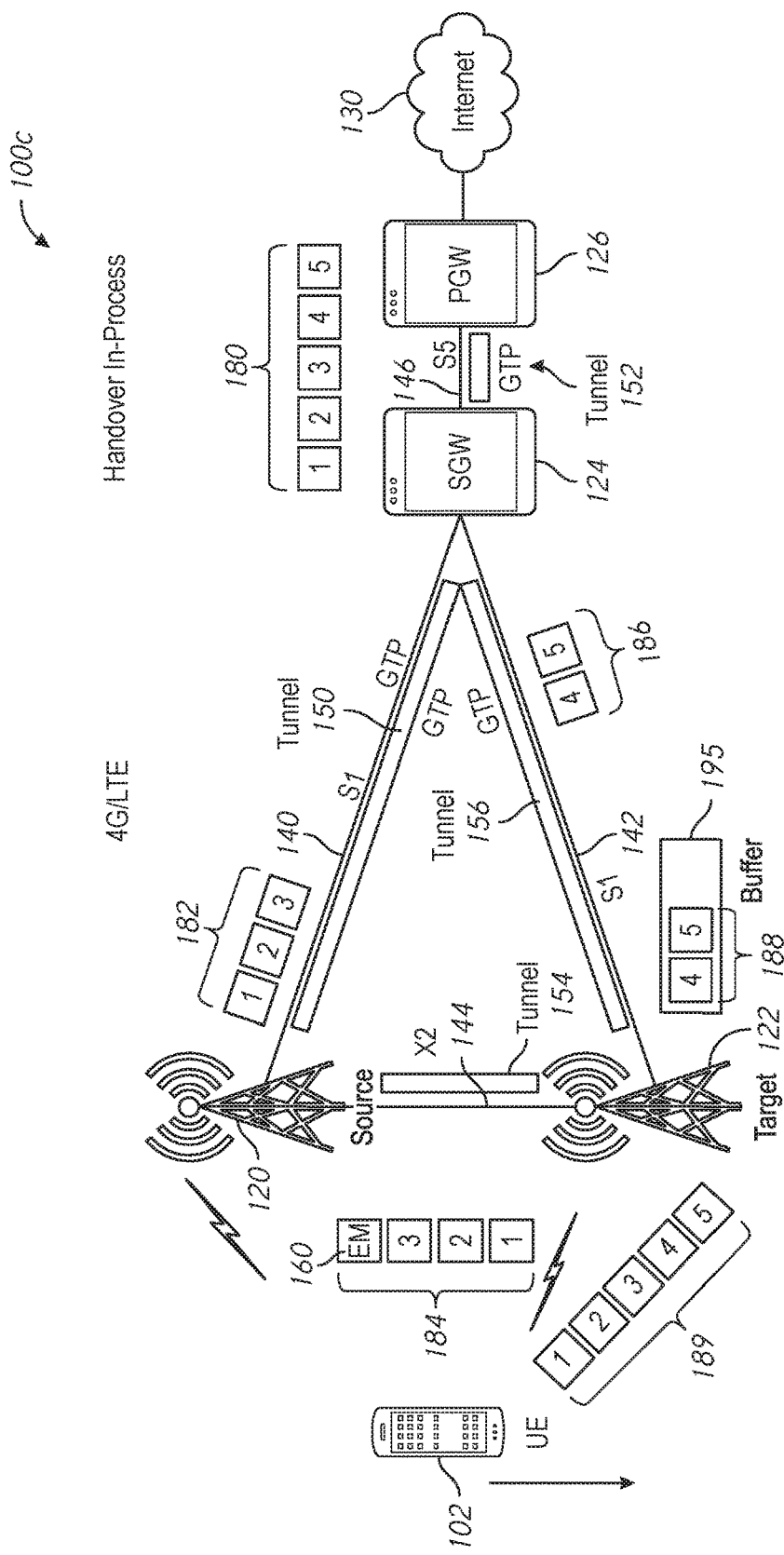
Figure 1D:
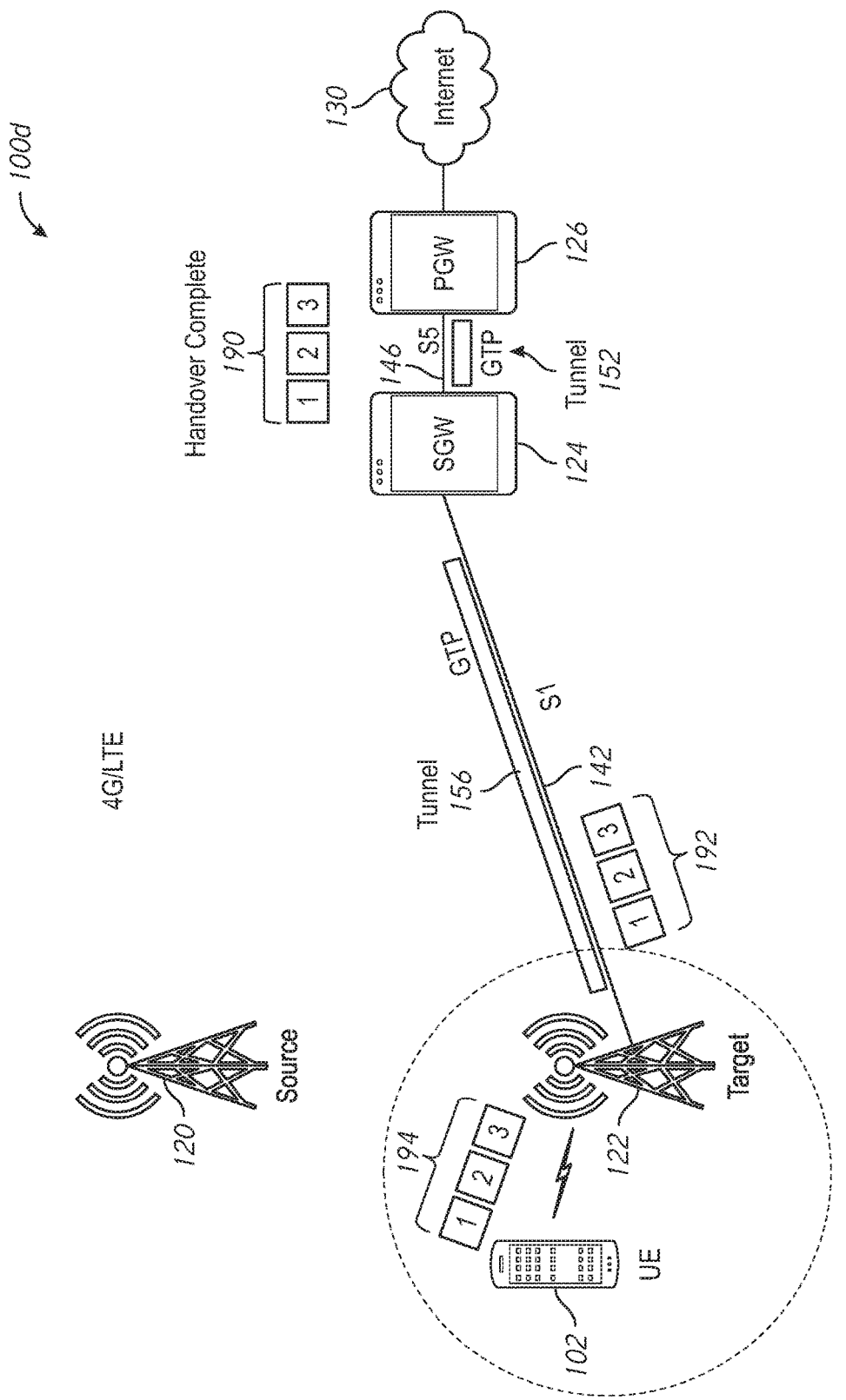

FIGS. 1B, 1C and 1D are illustrative network node diagrams 100b, 100c, and 100d, respectively, of relevant network nodes of the 4G/LTE mobile network of FIG. 1A, for describing a technique for UE handover which utilizes end marker functionality. End marker functionality is provided in order to maintain the proper ordering of data packets sent to UE 102 during a handover. Note that end marker functionality for 4G/LTE is specified in 3GPP 29.28 (section 7.3.2).

Network node diagram 100b of FIG. 1B illustrates UE 102, a base station 120, a serving gateway-user plane (SGW-U or simply "SGW") 124, and a PDN gateway-user plane (PGW-U or simply "PGW") 126 for connection to the Internet 130. In general, communication between UE 102 and base station 120 may be provided over an air (radio) interface. Communication between base station 120 and SGW 124 may be provided over an interface 140 (e.g. an S1 interface), whereas communication between SGW 124 and PGW 126 may be provided over an interface 146 (e.g. an S5 interface).

Initially in FIG. 1B, PGW 126 may send a plurality of data packets 160 (illustrated as data packets 1, 2, and 3) to SGW 124 over interface 146, communicated via a tunnel 152 using a tunneling protocol. The tunneling protocol may be a GPRS tunneling protocol (GTP). These data packets 160 may be received by SGW 124 and sent to base station 120 via interface 140 as data packets 162, which are communicated via a tunnel 150 using a tunneling protocol (again, the GTP). Base station 120 may receive these data packets 162 and wirelessly communicate them to UE 102 over the air interface as data packets 164.

FIG. 1C illustrates data packet communications for UE 102 during a handover of UE 102 from base station 120 (the "source" base station) to a base station 122 (the "target" base station). Communication between base station 120 and base station 122 may be provided over an interface 144 (e.g. an X2 interface), and communication between base station 122 and SGW 124 may be provided over an interface 142 (e.g. an S1 interface).

As illustrated in FIG. 1C, PGW 126 may send a plurality of data packets 180 (illustrated as data packets 1, 2, 3, 4 and 5) to SGW 124 over interface 146, communicated via tunnel 152 using the tunneling protocol (again, the GTP). These data packets 180 may be received by SGW 124, which distributes the data packets between base stations 120 and 122 to accommodate the UE handover. In particular, SGW 124 may send some of the data packets to base station 120 over interface 140 (e.g. data packets 182 illustrated as data packets 1, 2, and 3) and some of the data packets to "target" base station 122 over interface 142 (i.e. data packets 186 illustrated as data packets 4 and 5). Again, data packets 182 may be communicated over interface 140 via tunnel 150 using the tunneling protocol (again, the GTP), and data packets 186 may be communicated over interface 142 via a tunnel 156 using the tunneling protocol (again, the GTP).

Base station 120 may receive these data packets 182 and send them to base station 122 over interface 144 as data packets 184, communicated via a tunnel 154 using a tunneling protocol (again, the GTP). An end marker message 160 may be inserted after the last one of transmitted data packets 184, signifying the end of data packets 184 on the "forwarding" path to base station 122. On the other hand, data packets 186 received by base station 122 over the "direct path" may be buffered in a buffer 195 as data packets 188. The buffered data packets 188 are held in buffer 195 until base station 122 receives data packets 184 from base station 120 over the forwarding path to transmit to UE 102 over the air interface. Upon receipt of end marker message 160, base station 122 may release data packets 188 from buffer 195 and transmit them to UE 102 over the air interface. Data packets 184 from the forwarding path and data packets 188 from buffer 195 over the direct path are represented together as data packets 189 transmitted over the air interface to UE 102. As illustrated, data packets 189 are sent in their proper order to UE 102.

FIG. 1D illustrates basic packet communications to UE 120 via base station 122 after the handover previously described in relation to FIG. 1C. Initially, PGW 126 may send a plurality of data packets 190 (illustrated as data packets 1, 2, and 3) to SGW 124 over interface 146, communicated via tunnel 152 using the tunneling protocol (again, the GTP). These data packets 190 may be received by SGW 124 and sent to base station 122 via interface 142 as data packets 192, which are communicated via tunnel 156 using the tunneling protocol (again, the GTP). Base station 122 may receive these data packets 192 and wirelessly communicate them to UE 102 over the air interface as data packets 194.

Figure 3A:
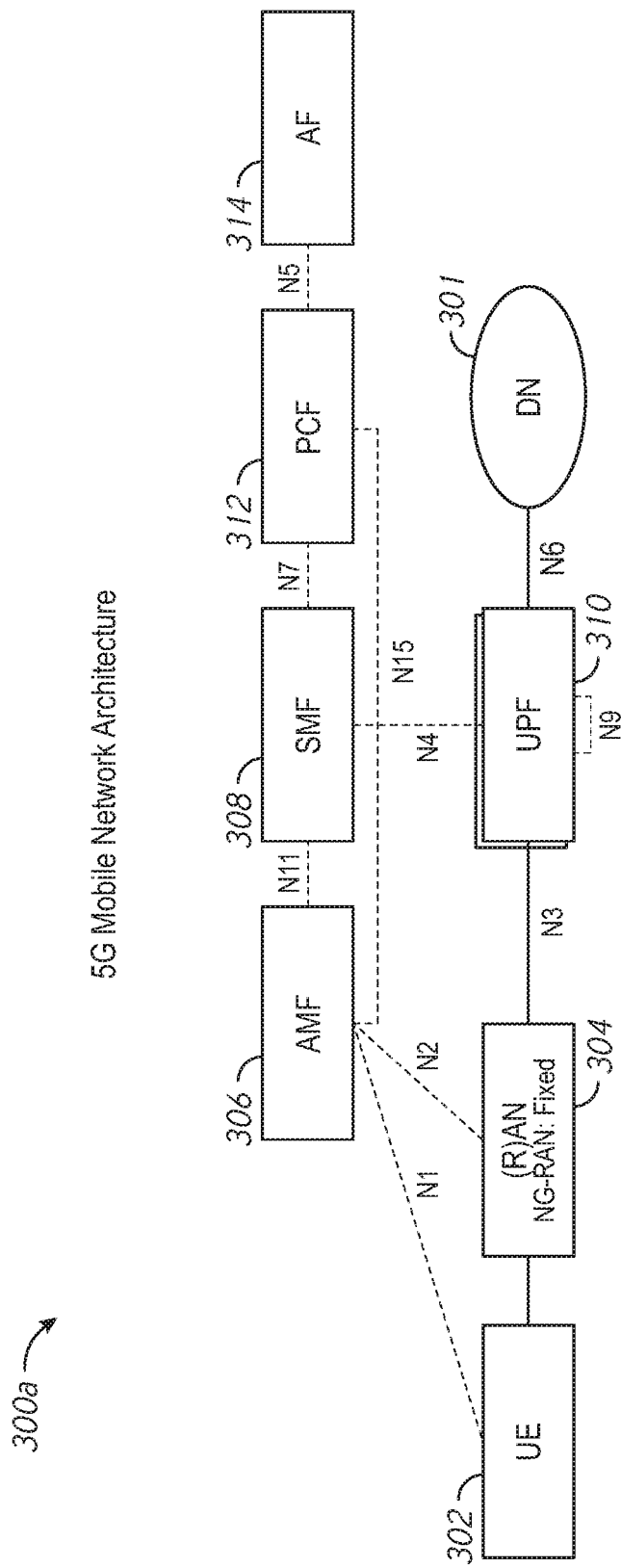
FIG. 3A is an illustrative representation of a network architecture of a 5G mobile network.

Network equipment and functions associated with existing 4G/LTE mobile networks of FIGS. 1A-1D are to be replaced and/or upgraded with network equipment and functions associated with 5G mobile networks. Referring ahead to FIG. 3A, what is shown is an illustrative representation of a network architecture 300a of a 5G mobile network. Network architecture 300a of FIG. 3A includes a radio access network (RAN) 304, an access and mobility management function (AMF) 306, a session management function (SMF) 308, a user plane function (UPF) 310, a policy control function (PCF) 312, and an application function (AF) 314. A plurality of interfaces or reference points N1, N2, N3, N4, N5, N6, N7, N9, N11, and N15 of network architecture 300a for 5G define the interfaces and/or protocols between each of the entities, as described in the relevant (evolving) standards documents for 5G (e.g. 3GPP 23.501 and 23.502). A UE 302 may gain access to the 5G mobile network via RAN 304, which may include a plurality of base stations, such as eNodeBs or gNodeBs. UE 302 may be any suitable type of device, such as a cellular telephone, a smart phone, a tablet device, an Internet of Things (IoT) device, and a machine-to-machine (M2M) device, to name but a few. Communications with nodes or devices on one or more data networks 301, such as the Internet, may be provided via UPF 310.

Currently, the mobile user plane for 5G (e.g. UPF 310 of FIG. 3A) makes use of tunneling (i.e. GTP) over interfaces N3, N9, and X2. However, it may be desirable to utilize segment routing (SR) for IPv6 (SRv6) over these reference points. To illustrate a few SRv6 implementations, FIGS. 2A-2D are block diagrams of network nodes which are configured to route packets using SRv6.

Figure 2A:
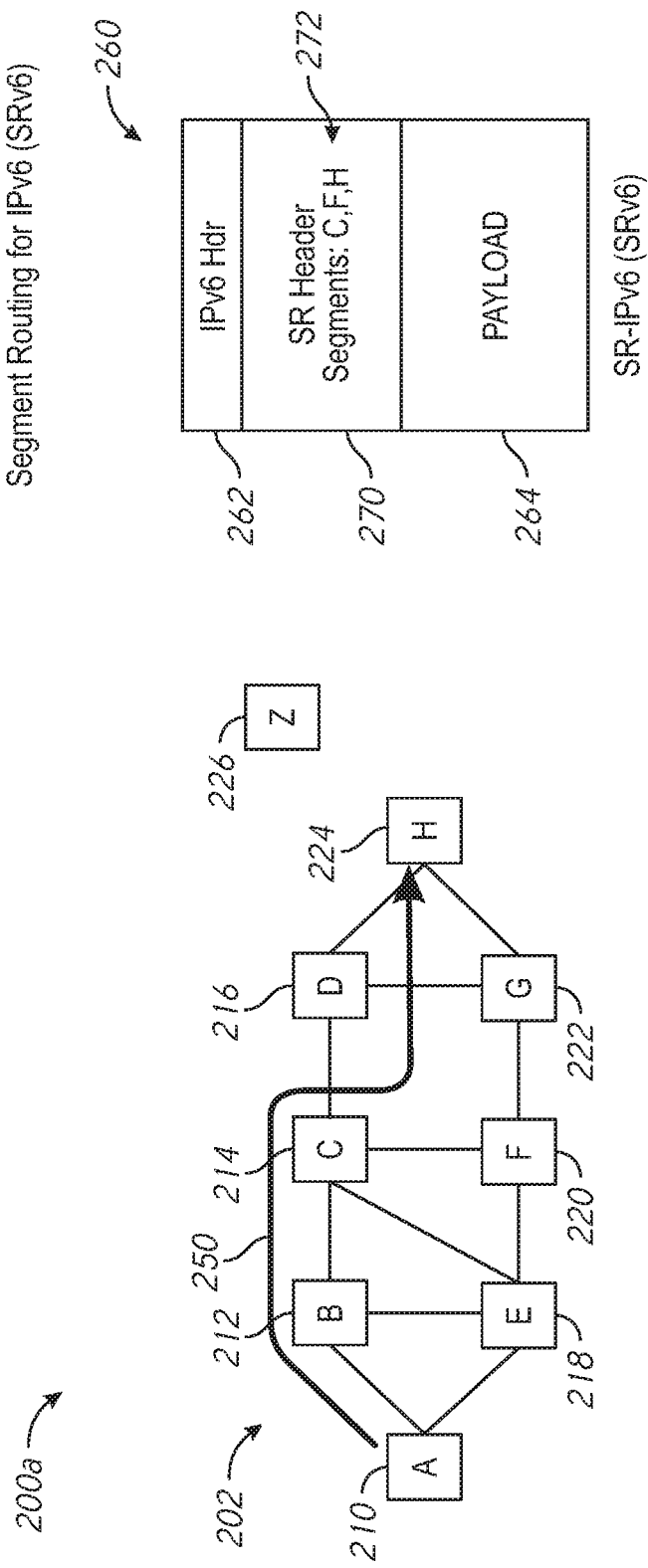
FIGS. 2A-2D are illustrative block diagrams of communication networks operative to route IP traffic flows with use of a segment routing (SR) for IPv6 (SRv6) protocol.

With reference first to FIG. 2A, a network 200a which includes a plurality of nodes 202 (e.g. routers, servers, base stations, gateways, CP or UP entities, etc.) is shown. In this example, the plurality of nodes 202 includes nodes 210, 212, 214, 216, 218, 220, 222, 224, and 226 which are designated as nodes A, B, C, D, E, F, G, H, and Z, respectively. Here, node 210 (i.e. node A) is considered to be a source node and node 226 (i.e. node Z) is considered to be a destination node. Nodes 212, 214, 216, 218, 220, 222, and 226 which correspond to nodes B, C, D, E, F, and G are part of an SR domain (i.e. nodes that are SRv6-capable nodes/SRv6-configured nodes). The source node (node 210 or A) and the destination node (node 226 or Z) are not part of or outside of the SR domain (e.g. they may or may not be SRv6-configured nodes, such as "regular" IPv6 nodes).

A basic data format of an SR-IPv6 packet 260 for use in SRv6 routing is also shown in FIG. 2A. As illustrated, the data format of SR-IPv6 packet 260 includes an IPv6 header 262 and a payload 264. For SRv6 routing of IPv6 packet 260, the data format of IPv6 packet 260 further includes an SR header 270 or "SRH" (i.e. an extension header for SR as defined by RFC 2460). SR header 270 may include an ordered list of segments 272 which defines a network path 250 along which the SR-IPv6 packet 260 will be communicated in network 200a. In the example of FIG. 2A, the ordered list of segments 272 includes node 214 ("node C"), node 220 ("node F"), and node 224 ("node H") in network path 250. A segment is or includes an instruction (e.g. forwarding, servicing, application-specific, etc.) to be applied to the SR-IPv6 packet 260. Thus, an SR-IPv6 packet (e.g. SR-IPv6 packet 260) may be communicated in network 200a from a source node (e.g. node 210 or A) to a destination node (e.g. a node 226 or Z) along a desired or predetermined network path 250. The source node (e.g. node 210 or A) may operate to choose this network path 250 and encode it in the SR header 270 as the ordered list of segments 272. The rest of network 200a may operate to execute the encoded instructions without any further per-flow state.

Figure 2B:
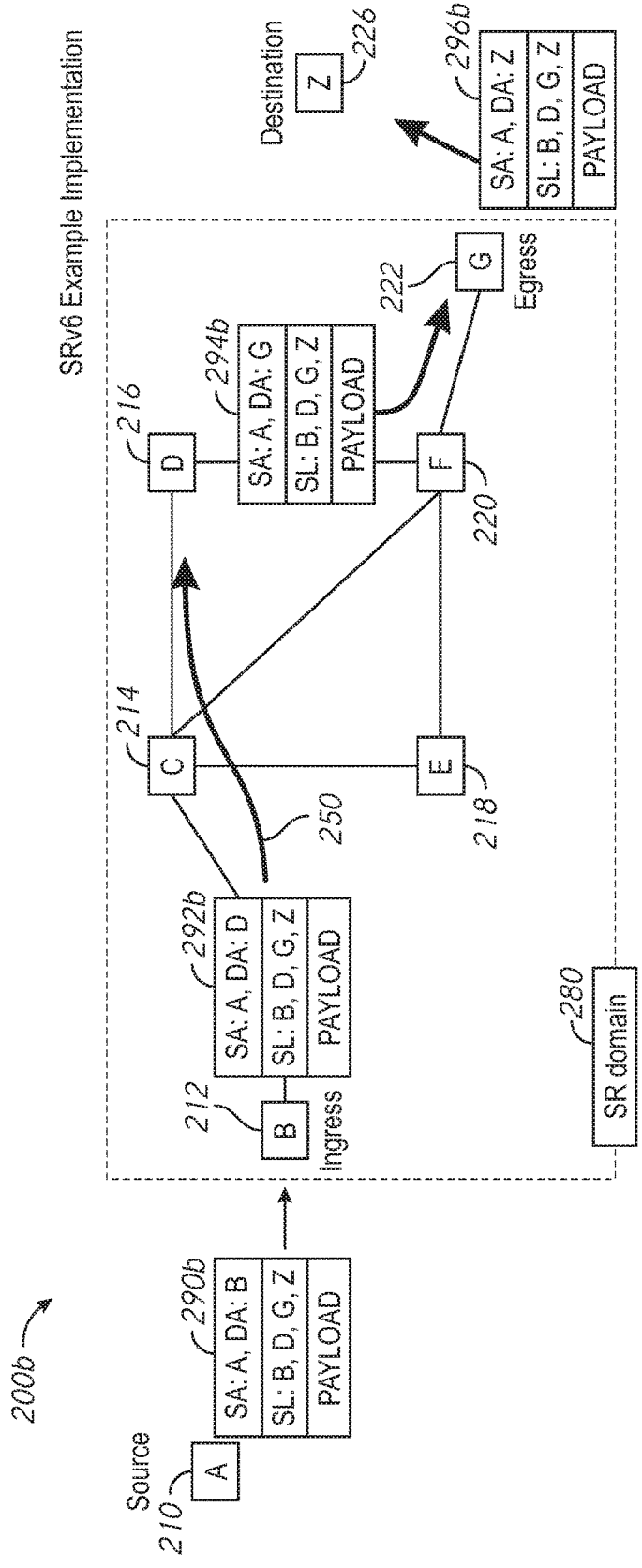

FIG. 2B is an illustrative representation of a network 200b which is similar to network 200a of FIG. 2A. Here, nodes 212, 214, 216, 218, 220, 222, and 226 which correspond to nodes B, C, D, E, F, and G are shown to be part of an SR domain 280. The source node (node 210 or A) and the destination node (node 226 or Z) are not part of or outside of the SR domain 280 (e.g. they may or may not be SRv6-configured nodes). In the example of FIG. 2B, node 212 or B may be considered as an ingress node of the SR domain 280 and node 222 or G may be considered as an egress node of the SR domain 280.

Note that an SR header may be inserted in an IPv6 packet at a source node or at an ingress node, or even encapsulated at the ingress node, as a few examples. In the example shown in FIG. 2B, an SR header of an IPv6 packet is inserted at the source node (node 210 or A) to produce an SR-IPv6 packet 290b. In this case, the source node (node 210 or A) which is SRv6-capable may originate the SR-IPv6 packet 290b. Here, the SR header of SR-IPv6 packet 290b includes an ordered list of segments (SL) designating nodes B, D, G, and Z to define network path 250. Initially, a source address (SA) of SR-IPv6 packet 290b is designated as node A and a destination address (DA) of SR-IPv6 packet 290b is designated as node B (i.e. the first node in the SL). When SR-IPv6 packet 290b is communicated to the ingress node (i.e. node 212 or B), the DA is modified by the ingress node to include the next or second node in the SL (i.e. node D), as indicated in SR-IPv6 packet 292b. When SR-IPv6 packet 292b is communicated to the node D (via node C), the DA is modified by node D to include the next or third node in the SL (i.e. node G), as indicated in SR-IPv6 packet 294b. When SR-IPv6 packet 294b is further communicated to the node G (via node F), the DA is modified by node G to include the next or fourth node in the SL (i.e. node Z which is the destination node), as indicated in SR-IPv6 packet 296b.

Figure 2C:
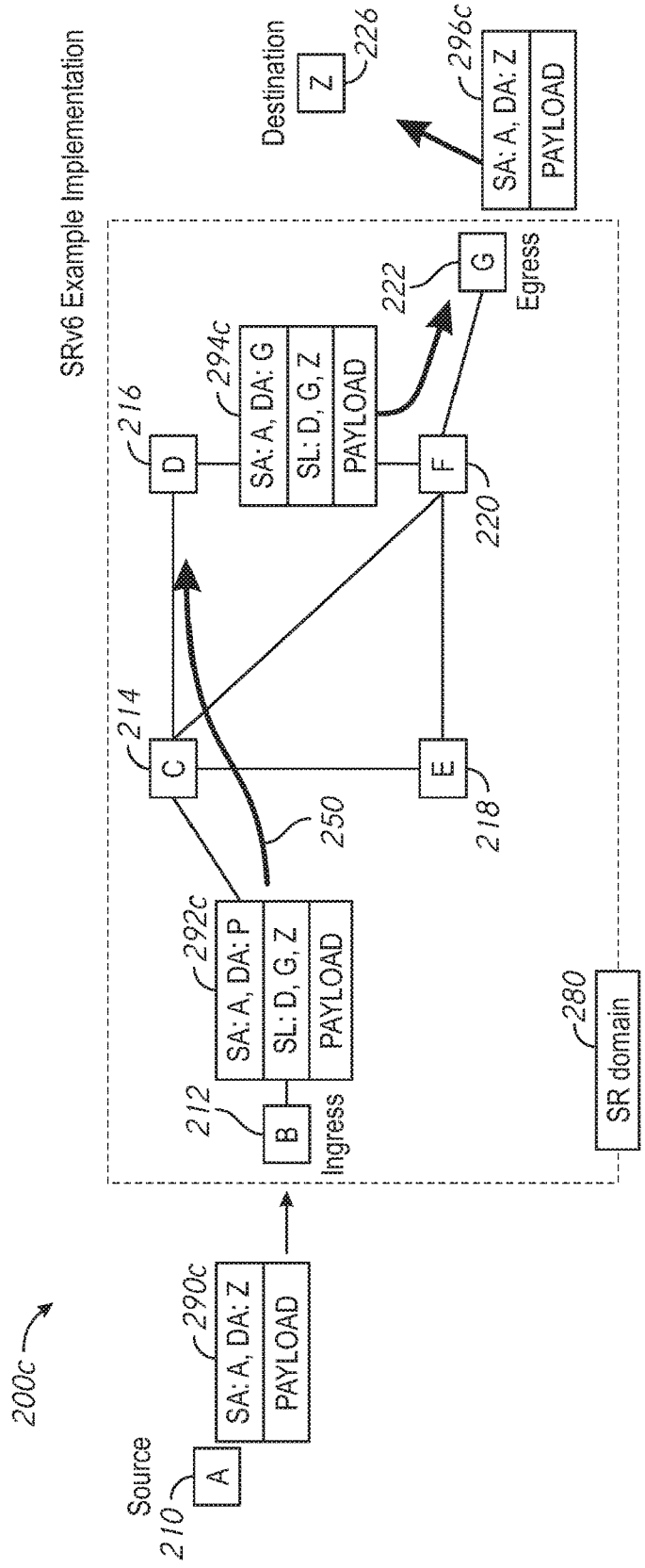

In the example of FIG. 2C, an SR header of an IPv6 packet 290c is inserted at the ingress node (node 212 or B) to produce an SR-IPv6 packet 292c. Here, the SR header of SR-IPv6 packet 292c includes an ordered list of segments (SL) designating nodes D, G, and Z to define network path 250. In this case, the source node, which may or may not be SRv6-configured, may originate the IPv6 packet 290c without any SR header. When SR-IPv6 packet 292c is communicated to node D (via node C), the DA is modified by node D to include the next or second node in the SL (i.e. node G), as indicated in SR-IPv6 packet 294c. When SR-IPv6 packet 294c is further communicated to the node G (via node F), the DA is modified by node G to include the next or third node in the SL (i.e. node Z, which is the destination node) and the SR header is removed, as indicated in IPv6 packet 296c. Here, similar to the source node, the destination node may or may not be SRv6-configured.

Figure 2D:
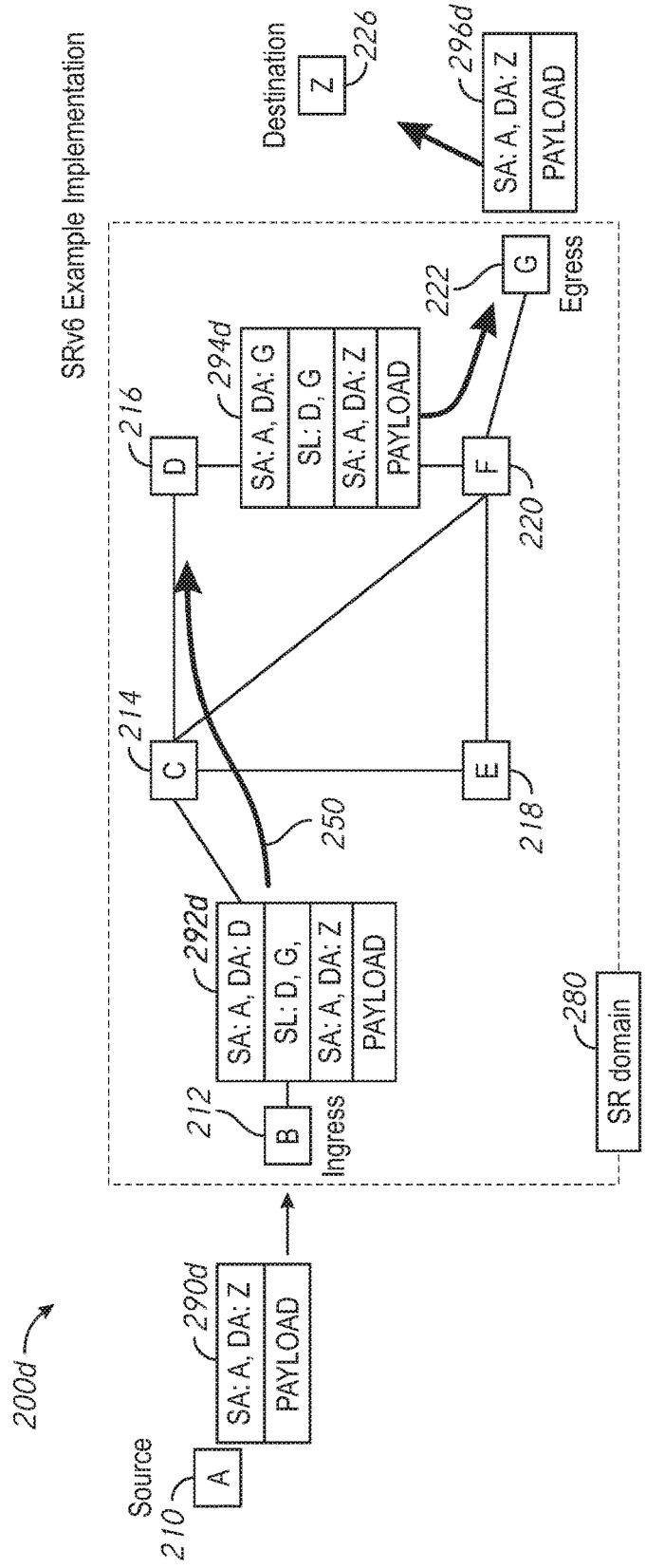

In the example of FIG. 2D, the source node, which may or may not be SRv6-configured, originates an IPv6 packet 290d without any SR header. The ingress node (node 212 or B) operates to encapsulate IPv6 packet 290d with a new, outer IPv6 header followed by an SR header, to produce an SR-IPv6 packet 292d. The SL of the SR header includes nodes D and G, but does not include the destination node (node 226 or Z). When SR-IPv6 packet 292d is communicated to node D (via node C), the DA is modified by node D to include the next or second node in the SL (i.e. node G), as indicated in SR-IPv6 packet 294d. When SR-IPv6 packet 294d is further communicated to the node G (via node F), the SR-IPv6 packet 294d is decapsulated by node G, which is represented by SR-IPv6 packet 296d. Here, similar to the source node, the destination node may or may not be SRv6-configured.

Note that the current state of the art for SRv6 may be further described in various standards-related documents, including Internet Engineering Task Force (IETF) documents, such as "Segment Routing Architecture" identified by "draft-ietf-spring-segment-routing-14"; "IPv6 Segment Routing Header (SRH)" identified by "draft-ietf-6man-segment-routing-header-07"; and "SRv6 Network Programming" identified by "draft-filsfils-spring-srv6-network-programming-03".

With reference again to FIG. 3A, in 5G mobile networks, it is advantageous to utilize SRv6 over interfaces that currently utilize GTP (e.g. the N3, N9, and X2 interfaces). However, ubiquitous deployment and transitioning associated with SRv6-configured mobile user planes may be provided over time, and therefore, partial replacement architectures and upgrades may exist. In some implementations of the present disclosure, replacing GTP with SRv6 may be provided in phases or stages. End marker functionality for 5G is specified in 3GPP 23.501 (section 5.8.2) and 3GPP 23.502 (section 4.9).

Accordingly, there is a need to provide end marker functionality for SRv6-configured mobile user planes, especially suitable for 5G mobile network migration.

Figure 3B:
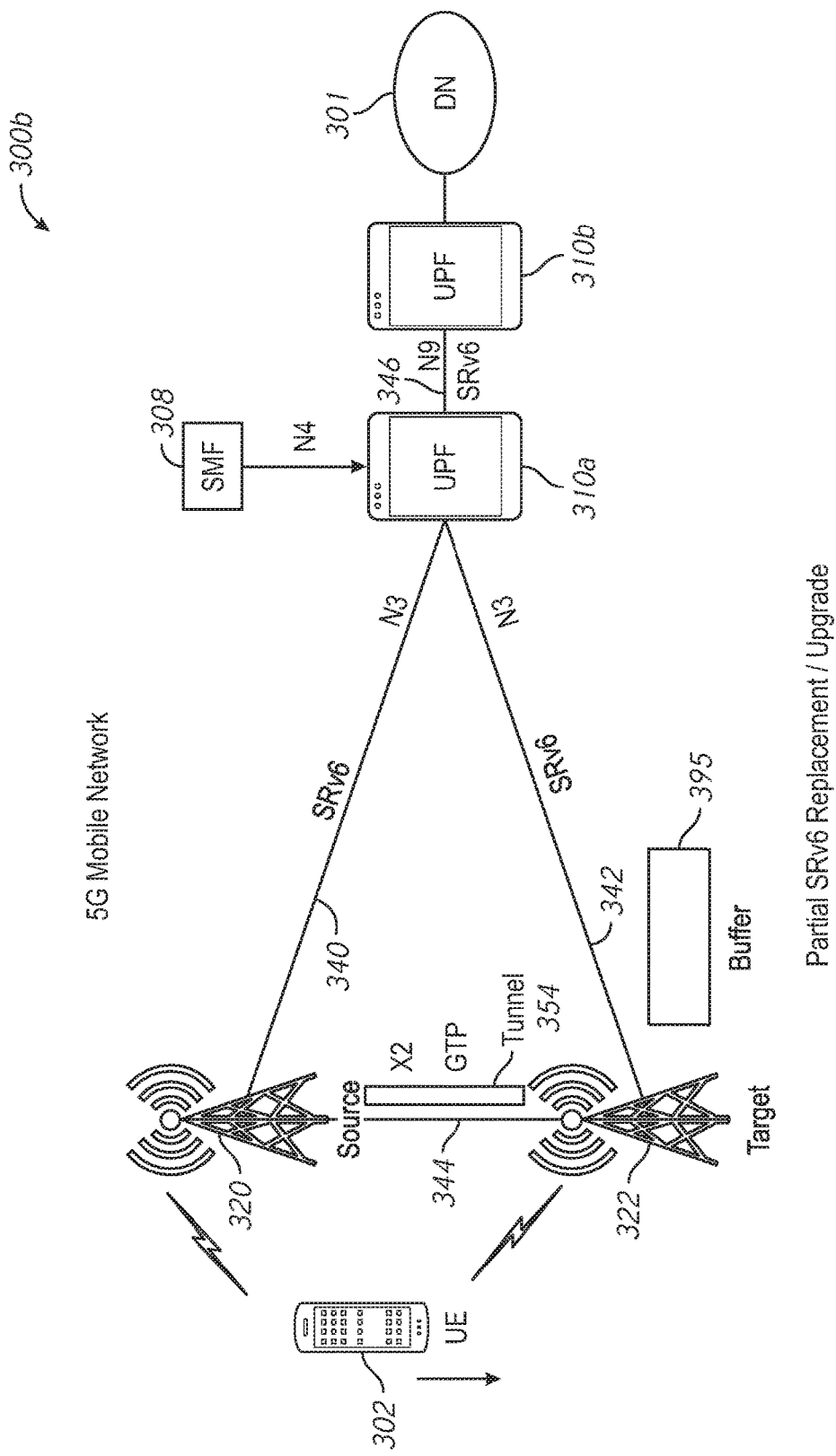
FIGS. 3B, 3C, and 3D are illustrative network node diagrams of relevant network nodes of the 5G mobile network of FIG. 3A, for describing techniques for providing the end marker functionality in mobile networks having mobile user planes configured with SRv6 in accordance with some implementations of the present disclosure.
Figure 3C:
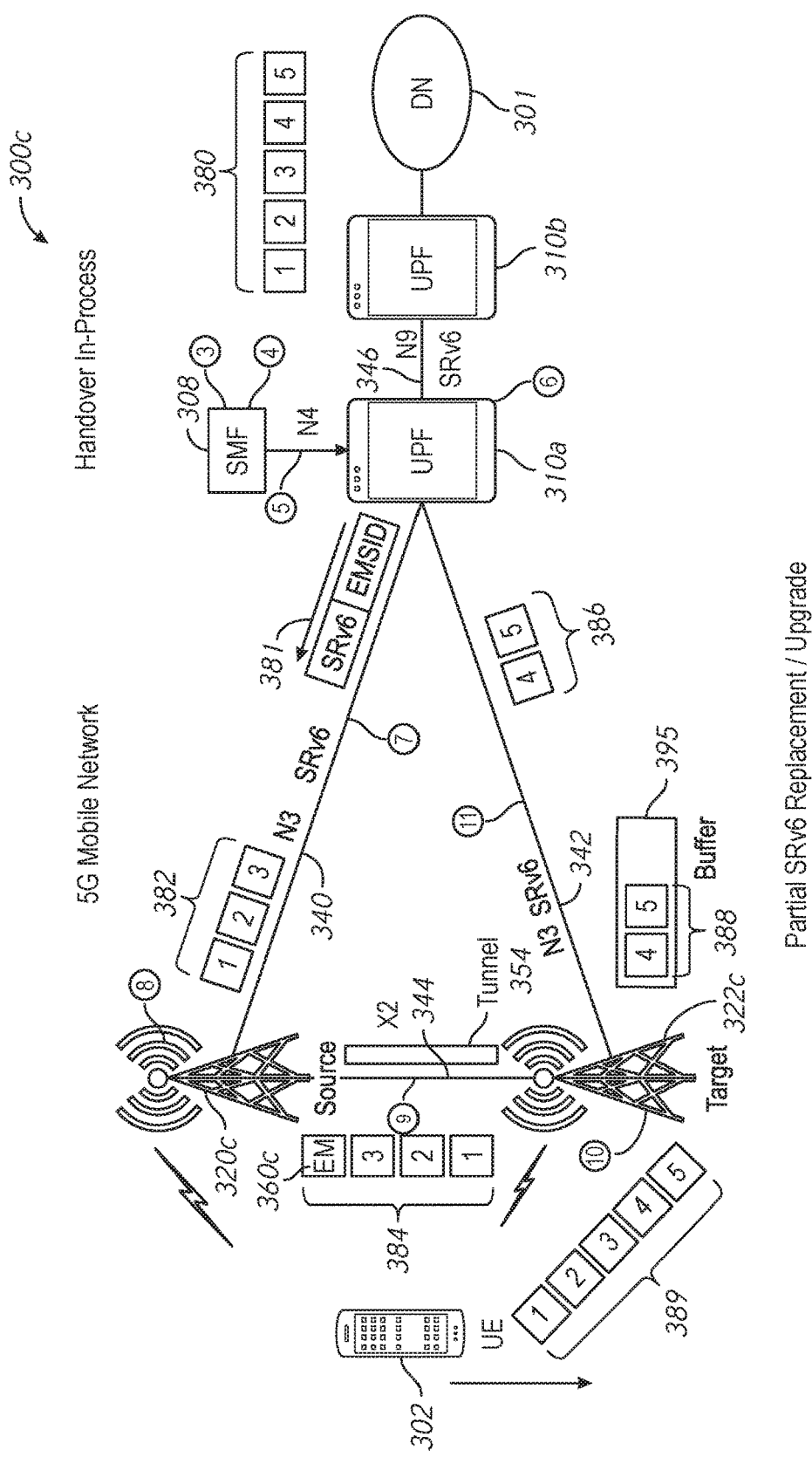
Figure 3D:
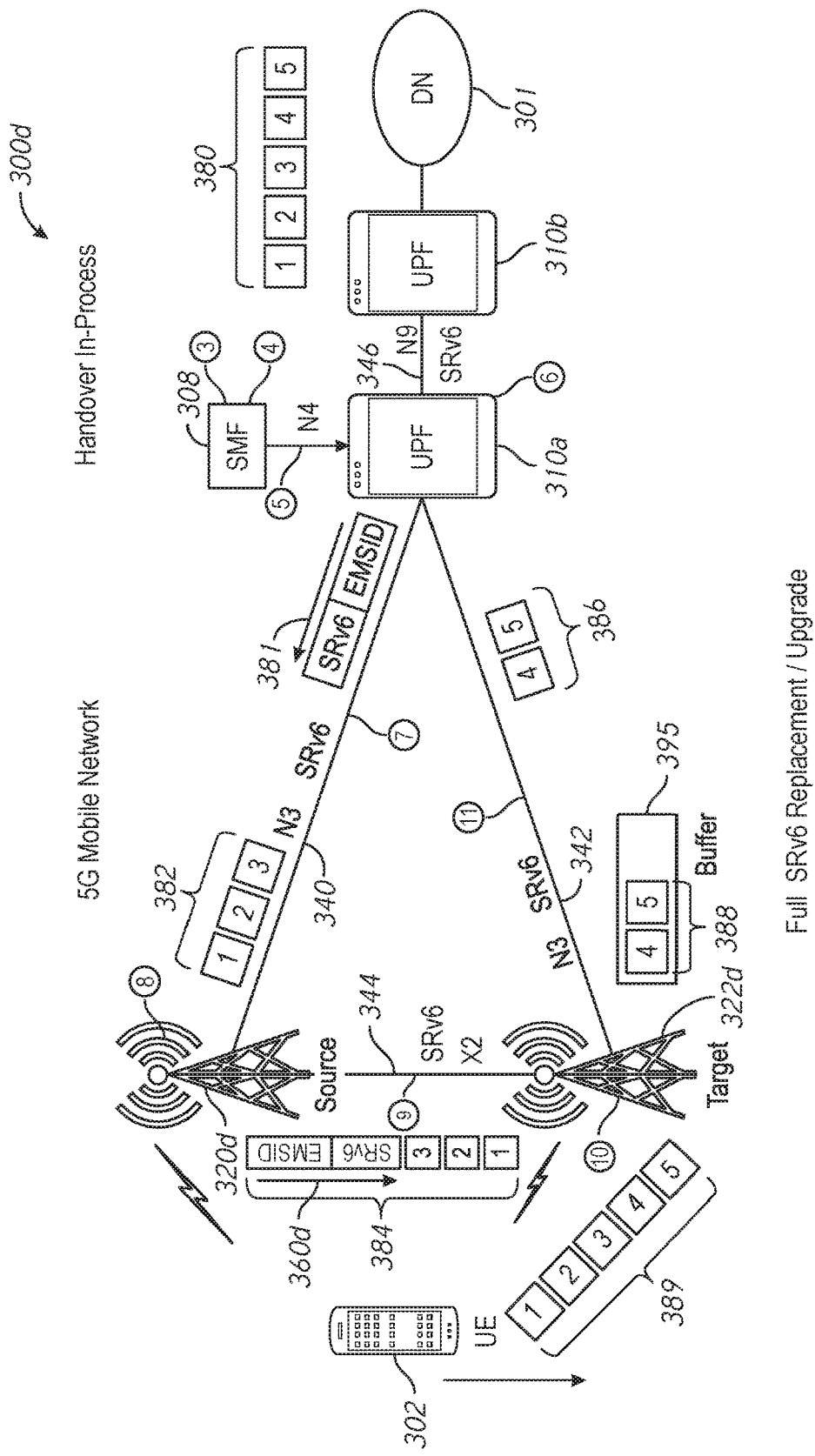

FIGS. 3B, 3C, and 3D are illustrative network node diagrams 300b, 300c, and 300d, respectively, of relevant network nodes of the 5G mobile network of FIG. 3A, for describing techniques for providing end marker functionality in mobile networks having mobile user planes configured with SRv6. In particular, FIGS. 3B-3C relate to partial SRv6 replacement/upgrades, where communication between base stations and UPFs utilize SRv6 (as does the core network) but communication between source and base stations utilize GTP. On the other hand, FIG. 3D relates to a full SRv6 replacement/upgrade, where communication between base stations and UPFs utilize SRv6 (as does the core network) and communication between source and base stations utilize SRv6.

In FIG. 3B, the relevant network nodes of the network node diagram 300b (i.e. the partial SRv6 replacement/upgrade) include a base station 320 which communicates with a UPF 310a over an interface 340 (e.g. an N3 interface) according to SRv6, and a base station 322 which communicates with the UPF 310a over an interface 342 (e.g. an N3 interface) according to SRv6. FIG. 3B also illustrates UPFs 310a and 310b which communicate over an interface 316 (e.g. an N9 interface) according to SRv6. On the other hand, base stations 320 and 322 communicate with each other over an interface 344 (e.g. an X2 interface) according to GTP over a (GTP) tunnel 354.

FIG. 3C illustrates the same partial replacement/upgrade architecture as described in relation to FIG. 3B, but includes further illustration regarding data packet communication during a UE handover from a base station 320c (the "source" base station) to a base station 322c (the "target" base station). As illustrated in FIG. 3C, UPF 310b may send a plurality of data packets 380 (illustrated as data packets 1, 2, 3, 4 and 5) to UPF 310b over interface 346, communicated via SRv6. These data packets 380 may be received by UPF 310a, which distributes the data packets between base stations 320c and 322c to accommodate the UE handover. More specifically, UPF 310a may send some of the data packets to base station 320c over interface 340 (e.g. data packets 382 illustrated as data packets 1, 2, and 3) and some of the data packets to "target" base station 322c over interface 342 (i.e. data packets 386 illustrated as data packets 4 and 5). Data packets 382 may be communicated over interface 340 using SRv6, and data packets 386 may be communicated over interface 342 using SRv6.

Base station 320c may receive these data packets 382 and send them to base station 322c over interface 344 as data packets 384, communicated via a tunnel 354 using a tunneling protocol (again, the GTP). An end marker message 360c may be inserted after the last one of transmitted data packets 384, signifying the end of the data packets on the "forwarding path." The end marker message 360c may be generated and sent by base station 320c in response to receiving from SMF 308 (via UPF 310a) an IP message 381 which includes an end marker segment identifier. IP message 381 may be an SRv6 message including an end marker SID ("EM SID"). Such messaging and techniques are described in relation to FIGS. 4A, 5A, 6A, and 7A-7C, and elsewhere herein.

On the other hand, data packets 386 received by base station 322c over the "direct path" may be buffered in a buffer 395 as data packets 388. The buffered data packets 388 are held in buffer 395 until base station 322c receives data packets 384 from base station 320c over the forwarding path to transmit to UE 102 over the air interface. Upon receipt of end marker message 360c, base station 322c may release data packets 388 from buffer 395 and transmit them to UE 102 over the air interface. Data packets 384 from the forwarding path and data packets 388 from buffer 395 over the direct path are represented together as data packets 389 transmitted over the air interface to UE 102. As illustrated, data packets 389 are sent in their proper order to UE 102.

FIG. 3D illustrates the full SRv6 replacement/upgrade, where communication between base stations and UPFs utilize SRv6 (as does the core network) and communication between source and base stations utilize SRv6 (i.e. no tunneling as previously described). Illustration regarding data packet communications during a UE handover from a base station 320d (the "source" base station) to a base station 322d (the "target" base station) is provided.

As illustrated in FIG. 3D, UPF 310b may send the plurality of data packets 380 (illustrated as data packets 1, 2, 3, 4 and 5) to UPF 310a over interface 346, communicated via SRv6. These data packets 380 may be received by UPF 310a, which distributes the data packets between base stations 320d and 322d to accommodate the UE handover. More specifically, UPF 310a may send some of the data packets to base station 320d over interface 340 (e.g. data packets 382 illustrated as data packets 1, 2, and 3) and some of the data packets to "target" base station 322d over interface 342 (i.e. data packets 386 illustrated as data packets 4 and 5). Data packets 382 may be communicated over interface 340 using SRv6, and data packets 386 may be communicated over interface 342 using SRv6.

Base station 320d may receive these data packets 382 and send them to base station 322d over interface 344 as data packets 384, communicated using SRv6. An IP message 360d which includes an end marker segment identifier may be sent from base station 320d to base station 322d, inserted after the last one of transmitted data packets 384, signifying the end of data packets on the forwarding path. IP message 360d may be an SRv6 message including an end marker SID ("EM SID"). IP message 360d may be generated and sent by base station 320d in response to receiving from SMF 308 (via UPF 310a) an IP message 381 which includes an end marker segment identifier. The IP message 381 may be an SRv6 message including an end marker SID ("EM SID"). Such messaging and techniques are described in relation to FIGS. 4A, 5B, 6B, and 8A-8C, and elsewhere herein.

On the other hand, data packets 386 received by base station 322d over the "direct path" may be buffered in a buffer 395 as data packets 388. The buffered data packets 388 are held in buffer 395 until base station 322d receives data packets 384 from base station 320d over the forwarding path to transmit to UE 102 over the air interface. Upon receipt of IP message 360d including the end marker, base station 322d may release data packets 388 from buffer 395 and transmit them to UE 102 over the air interface. Data packets 384 from the forwarding path and data packets 388 from buffer 395 over the direct path are represented together as data packets 389 transmitted over the air interface to UE 102. As illustrated, data packets 389 are sent in their proper order to UE 102.

Figure 4A:
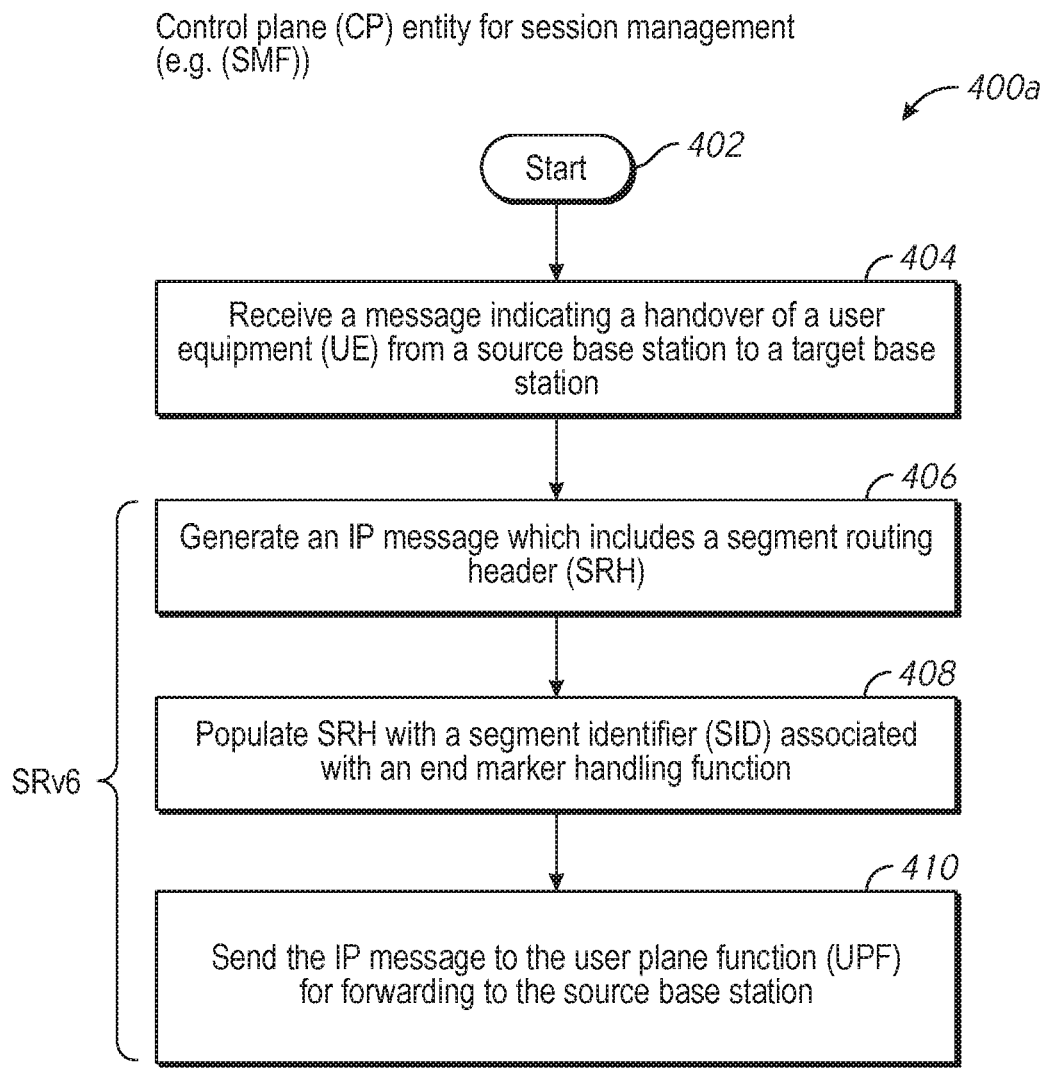
FIGS. 4A-4B are flowcharts for describing methods for providing end marker functionality in mobile networks having mobile user planes configured with SRv6, which may be performed by a control plane (CP) entity for session management (e.g. a session management function or "SMF") in the mobile network, in accordance with some implementations of the present disclosure.

FIG. 4A is a flowchart 400a for describing a method of providing end marker functionality in a mobile network having SRv6-configured mobile user planes according to some implementations of the present disclosure. The method may be embodied in and/or performed by a control plane (CP) entity for session management (e.g. an SMF, such as SMF 308 of FIGS. 3A-3C). The method may be executed on a server, network device, or network equipment if the mobile network. The method may be further embodied as a computer program product including a non-transitory computer readable medium and instructions stored in the computer readable medium where the instructions are executable on one or more processors of the server, network device, or network equipment for performing the steps of the method.

In the method of FIG. 4A, a UE may communicate in a data session via a base station of the mobile network, where a user plane (UP) entity (e.g. a UPF 310a of FIGS. 3A-3C) is selected to carry data traffic for the UE. Since the UE is being moved away from the base station, a handover of the UE may be performed from the base station (i.e. the "source" base station) to a "target" base station. In general, communication between the base station and the UP entity may be performed according to an SRv6 protocol; communication between the source and target base stations may be performed according to a GTP protocol or an SRv6 protocol (depending on the extent of the replacement/upgrade).

Beginning at a start block 402 of FIG. 4A, the CP entity may receive a message indicating the handover of the UE from the source base station to the target base station (step 404 of FIG. 4A). The message may be, for example, a message which includes a modify bearer request (MBR). In response to receiving the message, the CP entity may generate an IP message which includes a segment routing header (step 406 of FIG. 4A) and populate the segment routing header with a segment identifier (step 408 of FIG. 4A). The segment identifier may be associated with an end marker handling function, and may also be referred to as an end marker segment identifier. The IP message may also include a tunnel endpoint identifier (TEID) associated with the UE. The CP entity may send the IP message to the UP entity (step 410 of FIG. 4A).

In particular, the CP entity may send the IP message to the UP entity for forwarding to the source base station, as an instruction to the source base station to perform the end marker handling function. Specifically, the CP entity may set the source address as the UP entity and the destination address as the source base station, and send the IP message to the UP entity in an N4 message over the N4 interface. The source base station may be provisioned or configured with the end marker handling function, which is triggered or performed in response to identification of the end marker segment identifier.

The IP message may be an IP control message. In preferred implementations, the IP message is an SRv6 message, where the segment routing header (SRH) has one or more segment identifiers (SIDs) which include the end marker SID. The SRH may also include the TEID associated with the UE. In some implementations, the IP control message may be an Internet Control Message Protocol (ICMP) IPv6 (ICMPv6) message having a SRH with the end marker SID. In alternative implementations, the IP control message may be an empty packet where arguments (e.g. the end marker SID and/or the TEID) may be passed as type-length-values (TLVs).

In some implementations, the source and target base stations may communicate with each other in accordance with a GTP protocol. Here, the end marker segment identifier in step 408 may be associated with end marker handling function for GTP. The end marker handling function for GTP performed at the source base station may at least involve generating a tunneling protocol message comprising an end marker message, and sending the tunneling protocol message comprising the end marker message for receipt by the target base station. The tunneling protocol message may be a conventional GTP message comprising an end marker message. The TEID in the IP message may be used to identify the tunnel and/or UE for sending the message. The target base station may perform end marker functionality in response to receiving the end marker message. End marker functionality at the target base station may involve at least releasing buffered data packets received from the UP entity over the direct path for transmission to the UE.

In other implementations, the source and target base stations may communicate with each other in accordance with an SRv6 protocol. Here, the end marker segment identifier in step 408 may be associated with end marker handling for SRv6. The end marker handling function for SRv6 performed at the source base station may at least involve generating a new IP message having a segment routing header which includes a segment identifier associated with a function corresponding to an end marker message, and sending the new IP message for receipt by the target base station. This new IP message may be an SRv6 message, where the SRH has one or more SIDs which include the end marker SID. In some implementations, the new SRv6 message may be an ICMPv6 message. The target base station may perform end marker functionality in response to receiving the end marker message. End marker functionality at the target base station may involve at least releasing buffered data packets received from the UP entity over the direct path for transmission to the UE.

In yet other implementations, the CP entity may select either the end marker segment identifier for GTP or the end marker segment identifier for SRv6, based on stored information corresponding to the appropriate interface or communication between the source and target base stations (i.e. GTP or SRv6) and/or the configuration of the source and/or target base stations (see e.g. the method of FIG. 4B described later below). In yet even other implementations, the CP entity may provide an end marker segment identifier that is suitable for either GTP or SRv6, where the source base station determines and selects the appropriate functionality based on its interface or communications with the target base station (i.e. GTP or SRv6) and/or the configuration of the source and/or target base station (see e.g. the method of FIG. 4A in combination with FIG. 5C described later below).

Figure 4B:
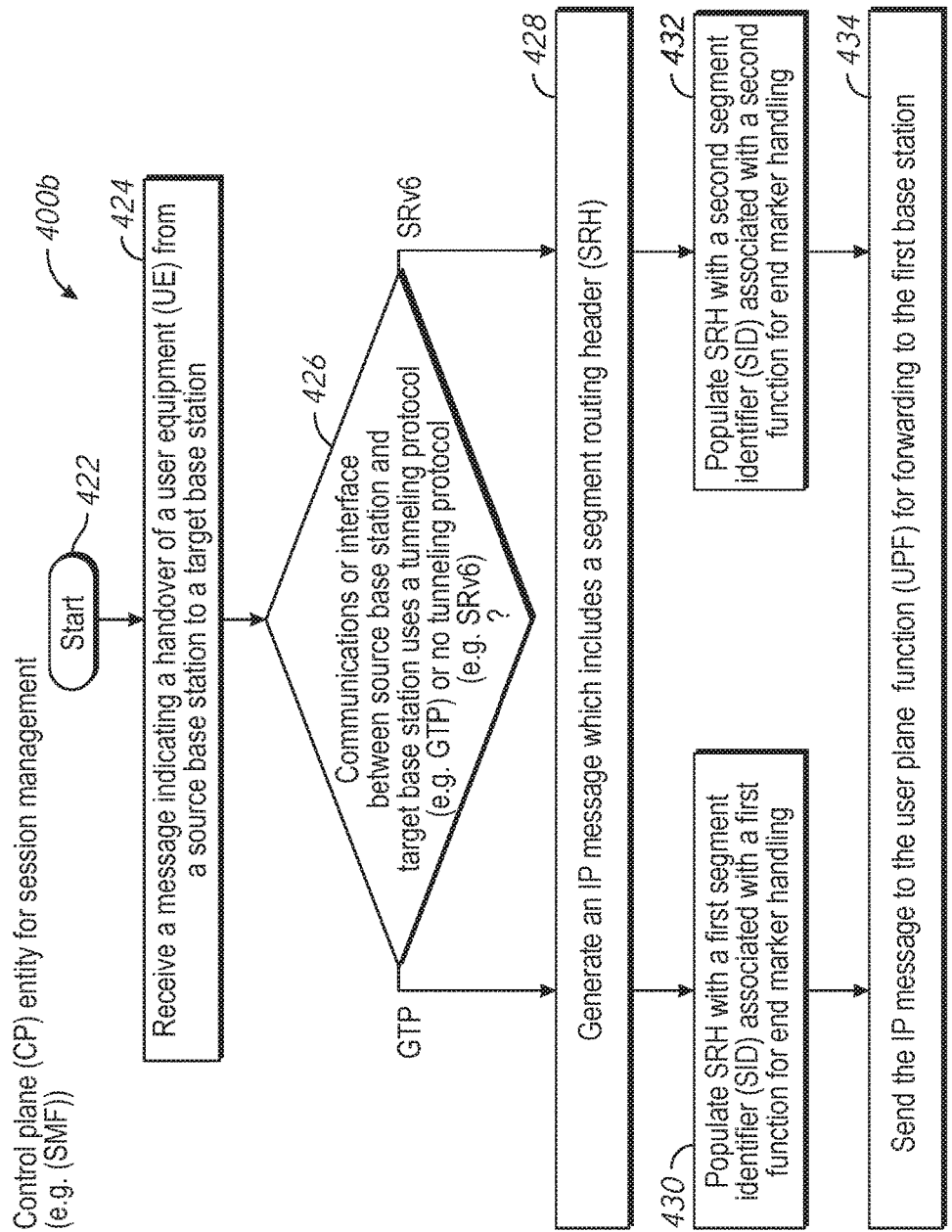

FIG. 4B is a flowchart 400b for describing a method of providing end marker functionality in a mobile network having SRv6-configured mobile user planes according to some implementations of the present disclosure. The method may be embodied in and/or performed by a CP entity for session management (e.g. an SMF, such as SMF 308 of FIG. 3A). The method may be executed on a server, network device, or network equipment if the mobile network. The method may be further embodied as a computer program product including a non-transitory computer readable medium and instructions stored in the computer readable medium where the instructions are executable on one or more processors of the server, network device, or network equipment for performing the steps of the method.

In the method of FIG. 4B, a UE may communicate in a data session via a base station of the mobile network, where a UP entity (e.g. a UPF 310*a* of FIG. 3A) is selected to carry data traffic for the UE. Since the UE is being moved away from the base station, a handover of the UE may be performed from the base station (i.e. the "source" base station) to a "target" base station. In general, communication between the base station and the UP entity may be performed according to an SRv6 protocol; communication between the source and target base stations may be performed according to either a GTP protocol or an SRv6 protocol (depending on the extent of the replacement/upgrade).

Beginning at a start block 422 of FIG. 4B, the CP entity may receive a message indicating the handover of the UE from the source base station to the target base station (step 424 of FIG. 4B). The message may be, for example, a message which includes a modify bearer request (MBR). In response to receiving the message, it is identified whether the communications or interface between the source base station and the target base station uses a tunneling protocol (e.g. GTP) or no tunneling protocol (e.g. SRv6) (step 426 of FIG. 4B).

If GTP is being utilized, the CP entity may generate an IP message which includes a segment routing header (step 428 of FIG. 4B) and populate the segment routing header with a first segment identifier (step 430 of FIG. 4B). The first segment identifier may be associated with a first end marker handling function (e.g. an end marker handling function for GTP), and may also be referred to as a first end marker segment identifier. The CP entity may then send the IP message to the UP entity (step 434 of FIG. 4B).

On the other hand, if GTP is not being utilized (e.g. SRv6 is utilized), the CP entity may generate an IP message which includes a segment routing header (step 428 of FIG. 4B) and populate the segment routing header with a second segment identifier (step 432 of FIG. 4B). The second segment identifier may be associated with a second end marker handling function (e.g. an end marker handling function for SRv6), and may also be referred to as a second end marker segment identifier. The CP entity may then send the IP message to the UP entity (step 434 of FIG. 4B).

Regarding the flowchart path involving steps 428, 430, and 434, the CP entity may generate and send the IP message to the UP entity for forwarding to the source base station, as an instruction to the source base station to perform the first end marker handling function (e.g. an end marker handling function for GTP interface). Specifically, the CP entity may set the source address as the UP entity and the destination address as the source base station, and send the IP message to the UP entity in an N4 message over the N4 interface. The source base station may be provisioned or configured with the first end marker handling function, which is triggered or performed in response to identification of the end marker segment identifier. At the source base station, the first end marker handling function (e.g. the end marker handling function for GTP interface) may at least involve generating a tunneling protocol message comprising an end marker message, and sending the tunneling protocol message comprising the end marker message for receipt by the target base station. The tunneling protocol message may be GTP message comprising a conventional end marker message. The target base station may perform end marker functionality in response to receiving the end marker message. End marker functionality at the target base station may involve at least releasing buffered data packets received from the UP entity over the direct path for transmission to the UE.

Regarding the flowchart path involving steps 428, 432, and 434, the CP entity may generate and send the IP message to the UP entity for forwarding to the source base station, as an instruction to the source base station to perform the second end marker handling function (e.g. an end marker handling function for SRv6 interface). Specifically, the CP entity may set the source address as the UP entity and the destination address as the source base station, and send the IP message to the UP entity in an N4 message over the N4 interface. The source base station may be provisioned or configured with the second end marker handling function, which is triggered or performed in response to identification of the second end marker segment identifier. At the source base station, the second end marker handling function (e.g. the end marker handling function for SRv6 interface) may at least involve generating a new IP message having a segment routing header which includes a segment identifier associated with a function corresponding to an end marker message, and sending the new IP message for receipt by the target base station. This new IP message may be an SRv6 message, where the SRH has one or more SIDs which include the end marker SID. In some implementations, the new SRv6 message may be an ICMPv6 message. The target base station may perform end marker functionality in response to receiving the end marker message. End marker functionality at the target base station may involve at least releasing buffered data packets received from the UP entity over the direct path for transmission to the UE.

The IP message may be an IP control message. In preferred implementations, the IP message is an SRv6 message, where the SRH has one or more SIDs which include the end marker SID. The SRH may also include the TEID associated with the UE. In some implementations, the IP control message may be an ICMPv6 message having a SRH with the end marker SID. In alternative implementations, the IP control message may be an empty packet where the arguments (e.g. the end marker SID and/or the TEID) may be passed as TLVs.

Figure 5A:
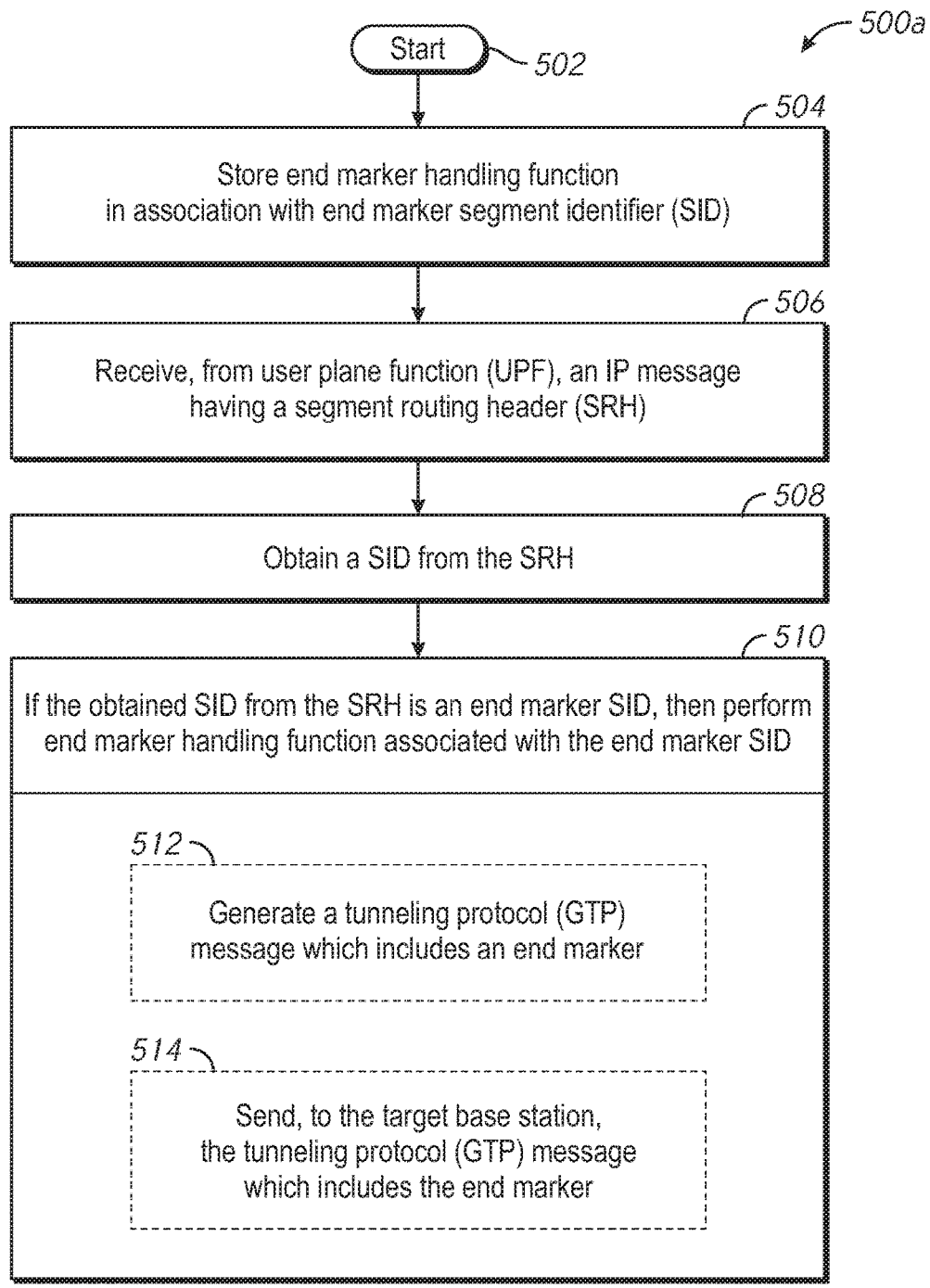
FIGS. 5A-5C are flowcharts for describing methods for providing end marker functionality in mobile networks having mobile user planes configured with SRv6, which may be performed by a (source) base station (eNodeB or gNodeB) in the mobile network, in accordance with some implementations of the present disclosure.

FIG. 5A is a flowchart 500*a* for describing a method for providing end marker functionality in mobile networks having mobile user planes configured with SRv6 according to some implementations of the present disclosure. The method may be embodied in and/or performed by a base station (i.e. the source base station) or eNodeB in the mobile network, where the base station is configured to communicate with the target base station according to a GTP protocol. The method may be further embodied as a computer program product including a non-transitory computer readable medium and instructions stored in the computer readable medium where the instructions are executable on one or more controllers or processors of the base station for performing the steps of the method.

In the method of FIG. 5A, a UE may communicate in a data session via the base station, where a UP entity (e.g. a UPF 310*a* of FIG. 3A) is selected to carry data traffic for the UE. Since the UE is being moved away from the base station, a handover of the UE may be performed from the base station (i.e. the "source" base station) to a "target" base station. In general, communication between the base station and the UP entity may be performed according to an SRv6 protocol; communication between the source and target base stations may be performed according to a GTP protocol.

Beginning at a start block 502 of FIG. 5A, the base station may store or maintain access to storage of an end marker handling function in association with an end marker segment identifier (step 504 of FIG. 5A). This step 504 (i.e. the provisioning of the segment identifier and associated function) may be provided (and be the same) for each one of a plurality of different base stations (e.g. all base stations). The base station may receive from the UP entity an IP message having a segment routing header (step 506 of FIG. 5A) and obtain a segment identifier from the segment routing header (step 508 of FIG. 5A). The base station may perform a function associated with the segment identifier obtained from the segment routing header. If the obtained segment identifier matches the end marker segment identifier, the function performed may be the end marker handling function associated therewith (step 510 of FIG. 5A).

Here, the end marker handling function may at least involve generating a tunneling protocol message comprising an end marker message (step 512 of FIG. 5A), and sending the tunneling protocol message comprising the end marker message for receipt by the target base station (step 514 of FIG. 5A). The tunneling protocol message may be a conventional GTP message comprising an end marker message. A TEID in the received IP message may be used to identify the tunnel or UE for sending the message. The target base station may perform end marker functionality in response to receiving the end marker message. End marker functionality at the target base station may involve at least releasing buffered data packets received from the UP entity over the direct path for transmission to the UE.

Figure 5B:
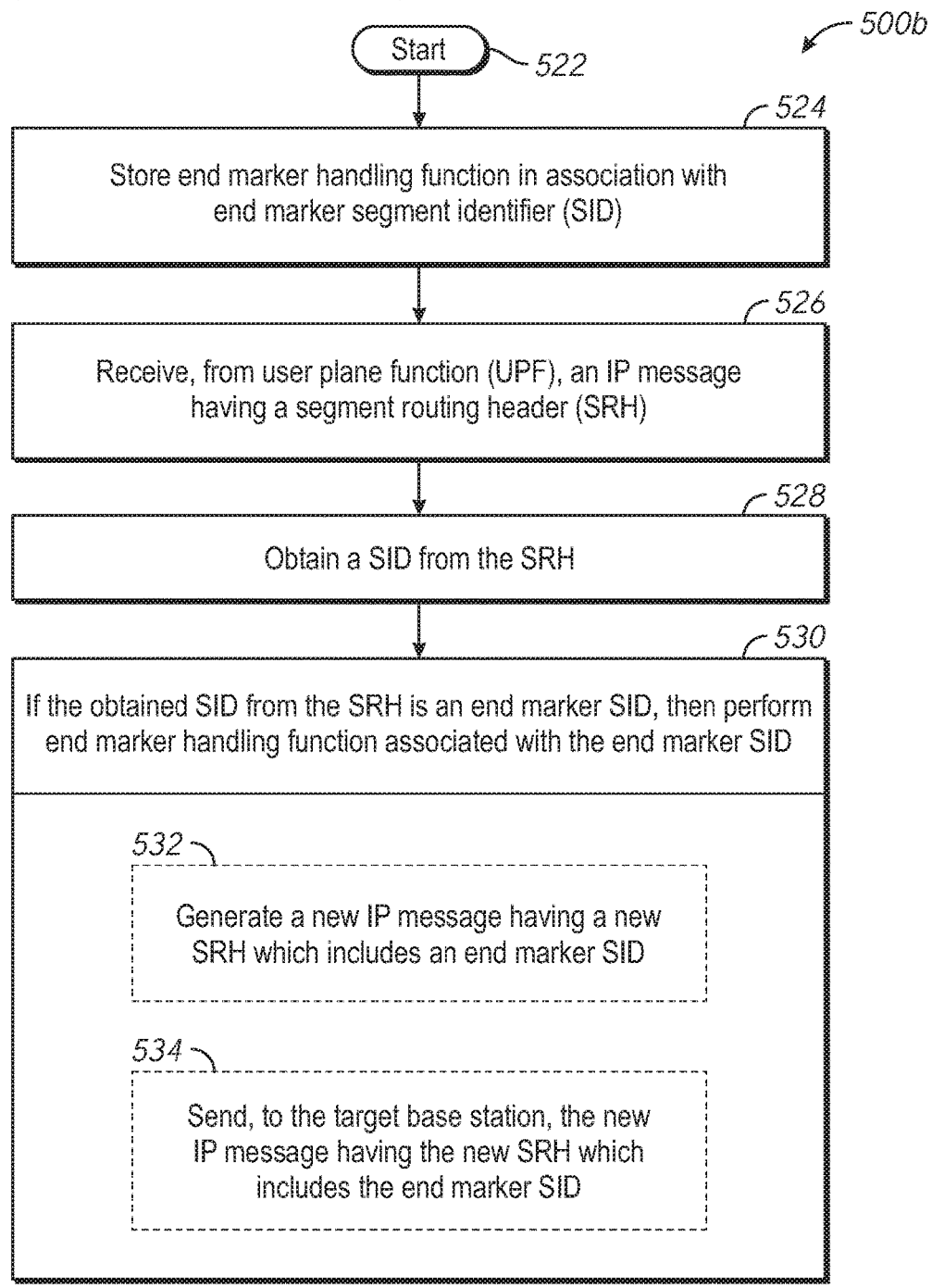

FIG. 5B is a flowchart 500b for describing a method for providing end marker functionality in mobile networks having mobile user planes configured with SRv6 according to some implementations of the present disclosure. The method may be embodied in and/or performed by a base station (i.e. the source base station) or eNodeB in the mobile network, where the base station is configured to communicate with the target base station according to an SRv6 protocol. The method may be further embodied as a computer program product including a non-transitory computer readable medium and instructions stored in the computer readable medium where the instructions are executable on one or more controllers or processors of the base station for performing the steps of the method.

In the method of FIG. 5B, a UE may communicate in a data session via the base station, where a UP entity (e.g. a UPF 310a of FIG. 3A) is selected to carry data traffic for the UE. Since the UE is being moved away from the base station, a handover of the UE may be performed from the base station (i.e. the "source" base station) to a "target" base station. In general, communication between the base station and the UP entity may be performed according to an SRv6 protocol; communication between the source and target base stations may be performed according to an SRv6 protocol.

Beginning at a start block 522 of FIG. 5B, the base station may store or maintain access to storage of an end marker handling function in association with an end marker segment identifier (step 524 of FIG. 5B). This step 524 (i.e. the provisioning of the segment identifier and associated function) may be provided (and be the same) for each one of a plurality of different base stations (e.g. all base stations). The base station may receive from the UP entity an IP message having a segment routing header (step 526 of FIG. 5B) and obtain a segment identifier from the segment routing header (step 528 of FIG. 5B). The base station may perform a function associated with the segment identifier obtained from the segment routing header. If the obtained segment identifier matches the end marker segment identifier, the function may be the end marker handling function associated therewith (step 530 of FIG. 5B).

Here, the end marker handling function may at least involve generating a new IP message having a segment routing header which includes a new segment identifier associated with a function corresponding to an end marker handling function (step 532 of FIG. 5B), and sending the new IP message for receipt by the target base station (step 534 of FIG. 5B). This new IP message may be an SRv6 message, where the SRH has one or more SIDs which include an end marker SID. In some implementations, the new SRv6 message may be an ICMPv6 message. The target base station may perform end marker functionality in response to receiving the end marker message. End marker functionality at the target base station may involve at least releasing buffered data packets received from the UP entity over the direct path for transmission to the UE.

Figure 5C:
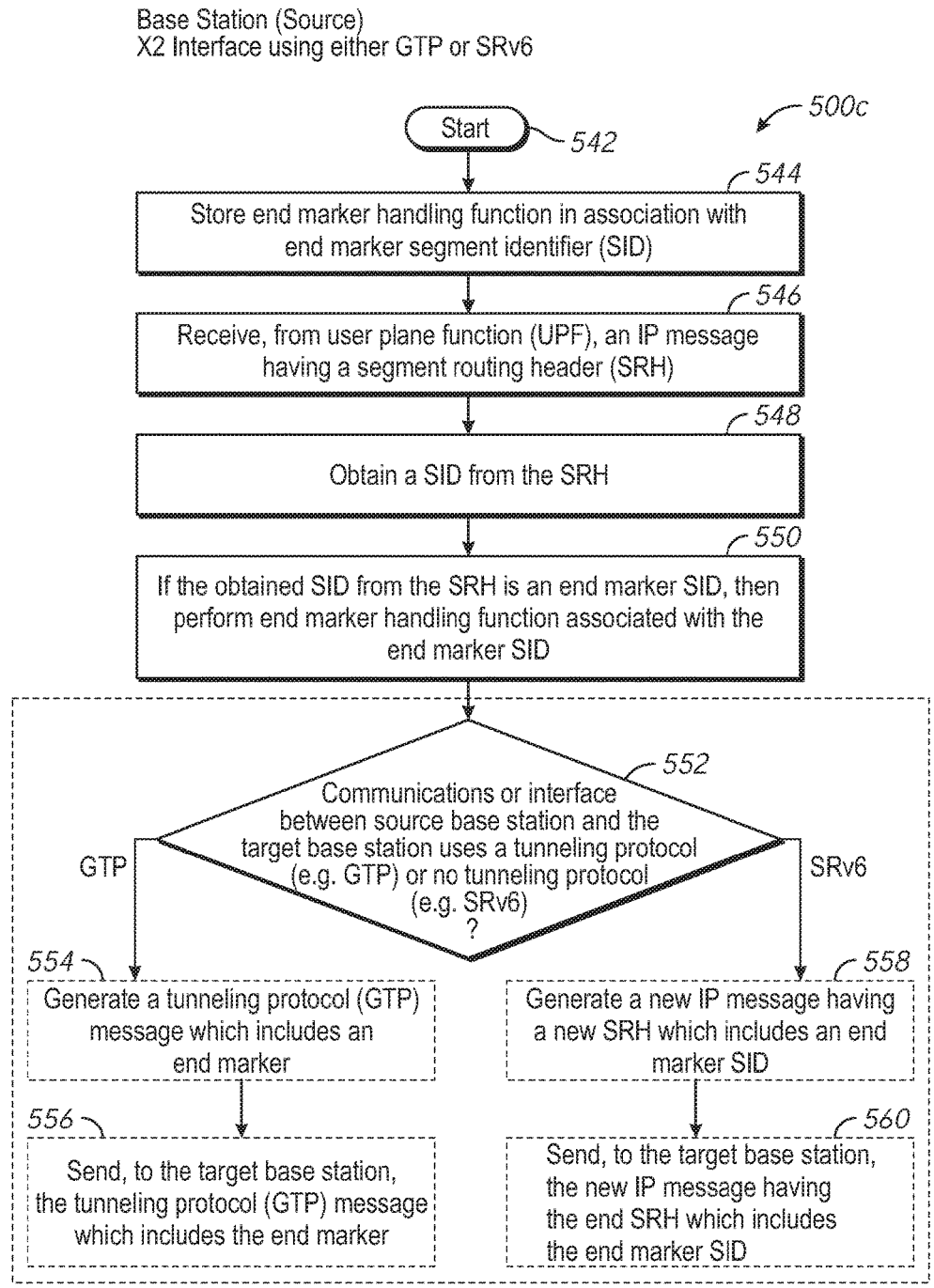

FIG. 5C is a flowchart 500c for describing a method for providing end marker functionality in mobile networks having mobile user planes configured with SRv6 according to some implementations of the present disclosure. The method may be embodied in and/or performed by a base station (i.e. the source base station) or eNodeB in the mobile network, where the base station is configured to communicate with the target base station according to either a GTP protocol or an SRv6 protocol (e.g. selected as determined at the base station). The method may be further embodied as a computer program product including a non-transitory computer readable medium and instructions stored in the computer readable medium where the instructions are executable on one or more controllers or processors of the base station for performing the steps of the method.

In the method of FIG. 5C, a UE may communicate in a data session via the base station, where a UP entity (e.g. a UPF 310a of FIG. 3A) is selected to carry data traffic for the UE. Since the UE is being moved away from the base station, a handover of the UE may be performed from the base station (i.e. the "source" base station) to a "target" base station. In general, communication between the base station and the UP entity may be performed according to an SRv6 protocol; communication between the source and target base stations may be performed according to either a GTP protocol or an SRv6 protocol.

Beginning at a start block 542 of FIG. 5C, the base station may store or maintain access to storage of an end marker handling function in association with an end marker segment identifier (step 544 of FIG. 5C). This step 544 (i.e. the provisioning of the segment identifier and associated function) may be provided (and be the same) for each one of a plurality of different base stations (e.g. all base stations). The base station may receive from the UP entity an IP message having a segment routing header (step 546 of FIG. 5C). The base station may obtain a segment identifier from the segment routing header (step 548 of FIG. 5C). The base station may perform a function associated with the segment identifier obtained from the segment routing header. If the obtained segment identifier matches the end marker segment identifier, the function may be the end marker handling function associated therewith (step 550 of FIG. 5C). Here, it is identified whether the communications or interface with the target base station uses a tunneling protocol (e.g. GTP) or no tunneling protocol (e.g. SRv6) (step 552 of FIG. 4B). The identification may be based on information regarding the communications, interface, base station type, or an indicator in the received IP message.

If GTP is being utilized, then the end marker handling function may at least involve generating a tunneling protocol message comprising an end marker message (step 554 of FIG. 5C), and sending the tunneling protocol message comprising the end marker message for receipt by the target base station (step 556 of FIG. 5C). The tunneling protocol message may be a conventional GTP message comprising an end marker message. A TEID in the received IP message may be used to identify the tunnel or UE for sending the message. On the other hand, if GTP is not being utilized (e.g. SRv6 is utilized), the end marker handling function may at least involve generating a new IP message having a segment routing header which includes a segment identifier associated with a function corresponding to an end marker (step 558 of FIG. 5C), and sending the new IP message for receipt by the target base station (step 560 of FIG. 5C). This new IP message may be an SRv6 message, where the SRH has one or more SIDs which include the end marker SID. In some implementations, the new SRv6 message may be an ICMPv6 message. In either case (i.e. GTP case in steps 554-556 or SRv6 case in steps 558-560), the target base station may perform end marker functionality in response to receiving the end marker indication. End marker functionality at the target base station may involve at least releasing buffered data packets received from the UP entity over the direct path for transmission to the UE.

Figure 6A:
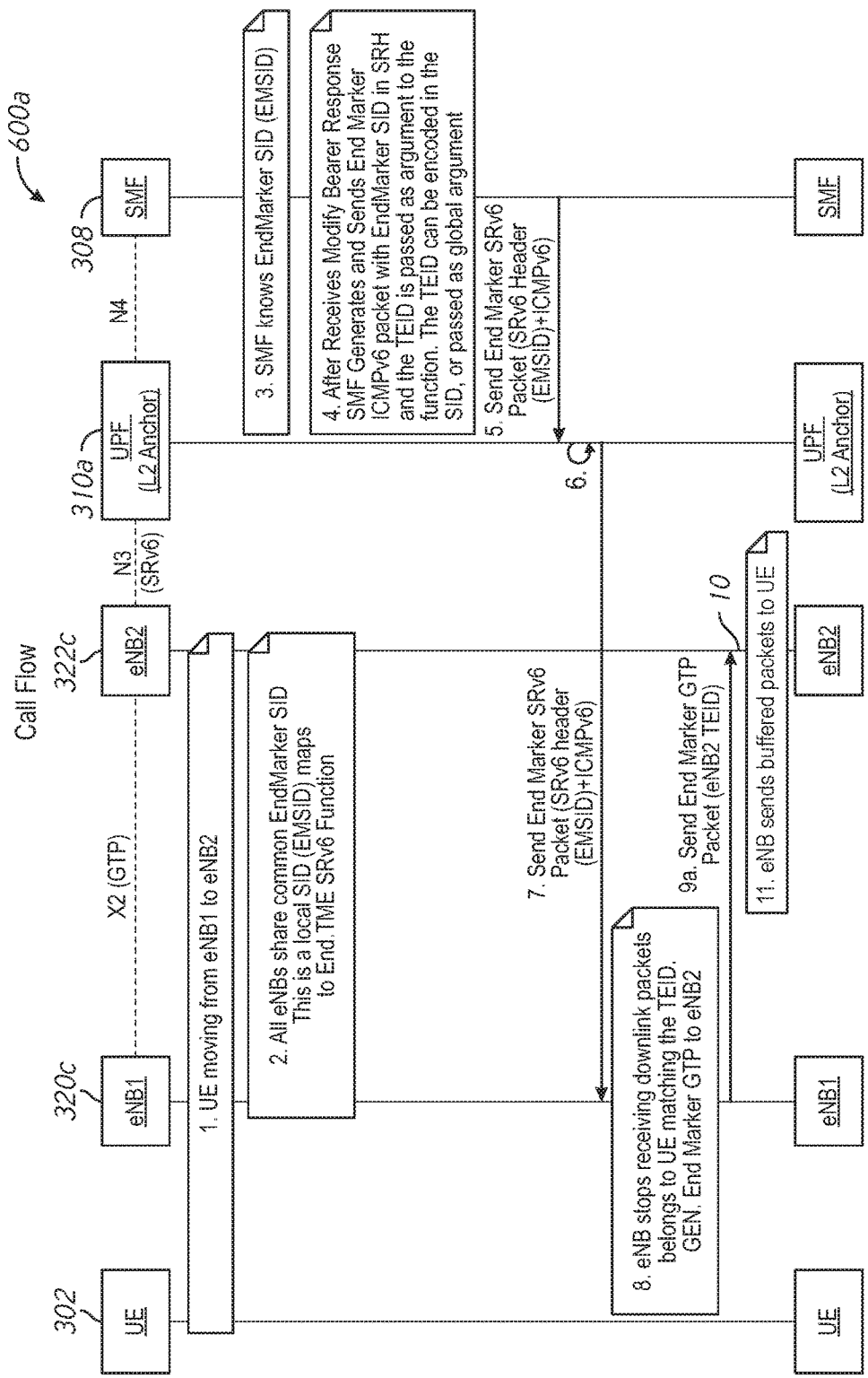
FIGS. 6A-6B are call flow diagrams involving relevant network nodes of the 5G mobile network of FIGS. 3A-3D, for describing methods for providing end marker functionality in mobile networks having mobile user planes configured with SRv6.
Figure 6B:
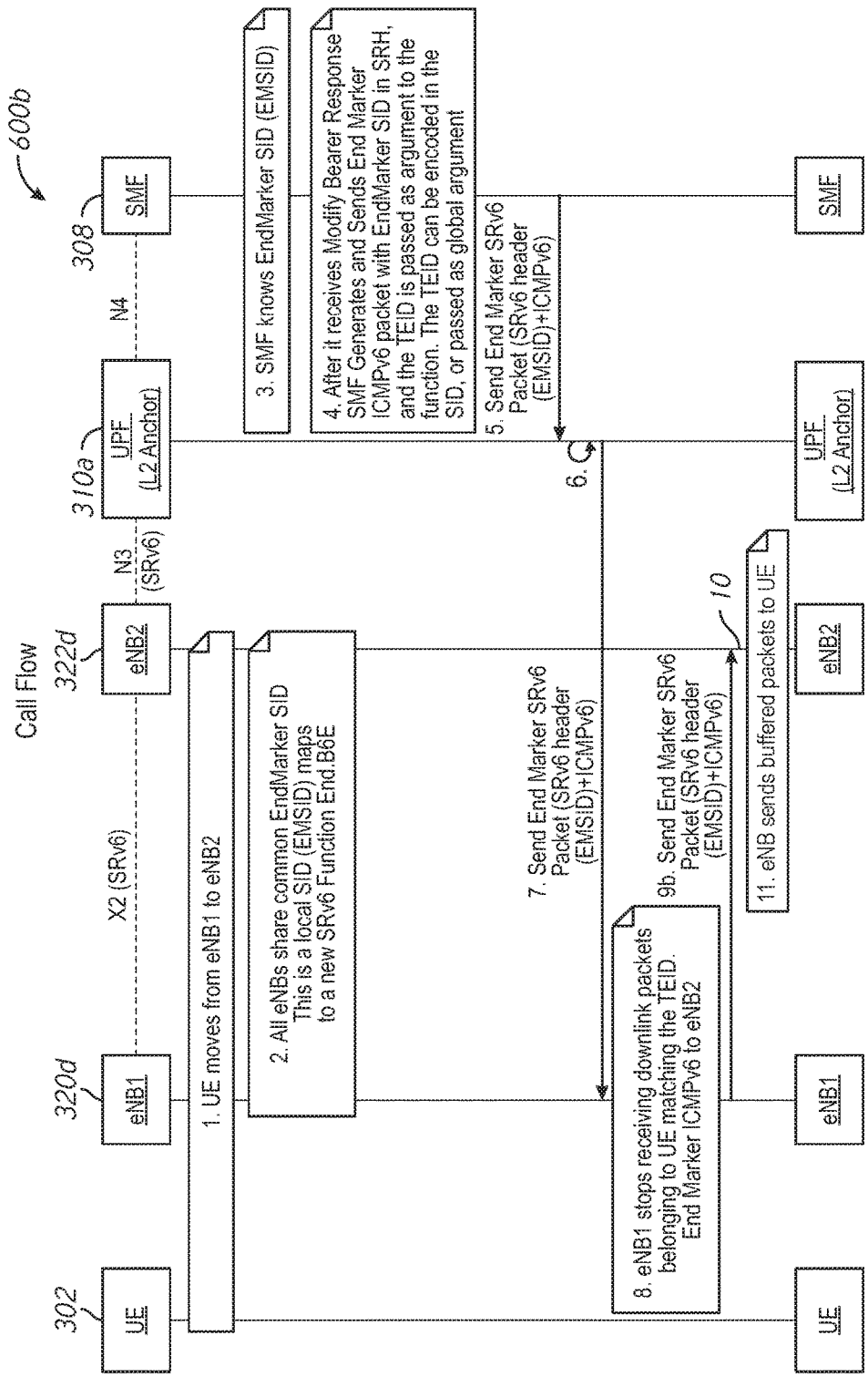

FIGS. 6A and 6B are call flow diagrams 600a and 600b, respectively involving relevant network nodes of the mobile network, for describing methods for providing end marker functionality in mobile networks having mobile user planes configured with SRv6. In FIG. 6A, call flow diagram 600a corresponds to the techniques previously described in relation to FIGS. 3C, 4A, and 5A (partial SRv6 replacement/upgrade) and messaging/functions of FIGS. 7A-7C. In FIG. 6B, call flow diagram 600b corresponds to the techniques previously described in relation to FIGS. 3D, 4A, and 5B (full SRv6 replacement/upgrade) and messaging/functions of FIGS. 8A-8C.

Call flow diagram 600a of FIG. 6A may be viewed together with the steps as indicated in the network node diagram 300c of FIG. 3C. UE 302 may communicate in a data session via a base station 320c of the mobile network, where UPF 310a is selected to carry data traffic for UE 302. In general, communication between base station 320c and UPF 310a may be performed according to an SRv6 protocol, whereas communication between base stations 320c and 322c may be performed according to a GTP protocol. UE 302 is being moved away from base station 320c (step 1 of FIG. 6A), and therefore a handover of UE 302 may be performed from base station 320c (i.e. the "source" base station) to base station 322c (i.e. the "target" base station).

Note that a plurality of base stations (including base station 320c) may be provisioned with and share a common, end marker SID associated with the appropriate end marker handling function (step 2 of FIG. 6A). The end marker handling function may be an end marker handling function for GTP (e.g. "End.TME" associated with FIGS. 7A-7C described later below). SMF 308 may also have knowledge and store the end marker SID associated with this function (step 3 of FIG. 6A).

SMF 308 may receive a message indicating the handover of UE 302 from base station 320c to base station 322c. The message may be, for example, a message which includes a modify bearer request (MBR). In response to receiving the message, SMF 308 may generate an SRv6 message and populate its SRH with the end marker SID (step 4 of FIG. 6A). The SRv6 message may also include a TEID associated with UE 302, encoded in the end marker SID or passed as a global argument. In some implementations, the SRv6 message may be an ICMPv6 message. In alternative implementations, the SRv6 message may be an empty packet where arguments (e.g. the end marker SID and/or the TEID) may be passed as TLVs.

SMF 308 may send the SRv6 message to UPF 310a (step 5 of FIG. 6A). In particular, SMF 308 may set the source address to UPF 310a and the destination address to base station 320c, and send the IP message to UPF 310a in an N4 message over the N4 interface. UPF 310a may receive the N4 message and remove the SRv6 message contained within it (step 6 of FIG. 6A). UPF 310a may forward or send the SRv6 message to base station 320c (step 7 of FIG. 6A). The SRv6 message is sent to base station 320c as an instruction to perform the end marker handling function for GTP. Thus, at base station 320c, the end marker handling function for GTP is triggered or performed in response to identification of the end marker SID.

The end marker handling function for GTP may at least involve generating a tunneling protocol message comprising an end marker message (step 8 of FIG. 6A) and sending the tunneling protocol message comprising the end marker message for receipt by base station 322c (step 9a of FIG. 6A). The tunneling protocol message may be a conventional GTP message comprising an end marker message. The TEID in the SRv6 message may be used to identify the tunnel and/or UE 302 for sending the message. Base station 322c may perform end marker functionality in response to receiving the end marker message (step 10 of FIG. 6A). End marker functionality at base station may involve at least releasing buffered data packets received from the UPF over the direct path for transmission to the UE (step 11 of FIG. 6A).

Moving ahead, call flow diagram 600b of FIG. 6B may be viewed together with the steps as indicated in the network node diagram 300d of FIG. 3D. UE 302 may communicate in a data session via a base station 320d of the mobile network, where UPF 310a is selected to carry data traffic for UE 302. In general, communication between base station 320d and UPF 310a may be performed according to an SRv6 protocol, and communication between base stations 320c and 322c may be performed according the SRv6 protocol. UE 302 is being moved away from base station 320d (step 1 of FIG. 6B), and therefore a handover of UE 302 may be performed from base station 320d (i.e. the "source" base station) to base station 322d (i.e. the "target" base station).

Note that a plurality of base stations (including base station 320d) may be provisioned with and share a common, end marker SID associated with the appropriate end marker handling function (step 2 of FIG. 6B). The end marker handling function may be an end marker handling function for SRv6 (e.g. "End.B6E" associated with FIGS. 8A-8C described later below). SMF 308 may also have knowledge and store the end marker SID associated with this function (step 3 of FIG. 6B).

SMF 308 may receive a message indicating the handover of UE 302 from base station 320d to base station 322d. The message may be, for example, a message which includes a modify bearer request (MBR). In response to receiving the message, SMF 308 may generate an SRv6 message and populate its SRH with the end marker SID (step 4 of FIG. 6B). The SRv6 message may also include a TEID associated with UE 302, encoded in the end marker SID or passed as a global argument. In some implementations, the SRv6 message may be an ICMPv6 message. In alternative implementations, the SRv6 message may be an empty packet where arguments (e.g. the end marker SID and/or the TEID) may be passed as TLVs.

SMF 308 may send the SRv6 message to UPF 310*a* (step 5 of FIG. 6B). In particular, SMF 308 may set the source address to UPF 310*a* and the destination address to base station 320*c*, and send the IP message to UPF 310*a* in an N4 message over the N4 interface. UPF 310*a* may receive the N4 message and remove the SRv6 message contained within it (step 6 of FIG. 6B). UPF 310 may forward or send the SRv6 message to base station 320*d* (step 7 of FIG. 6B). The SRv6 message is sent to base station 320*d* as an instruction to perform the end marker handling function for SRv6. Thus, at base station 320*d*, the end marker handling function for SRv6 is triggered or performed in response to identification of the end marker SID.

The end marker handling function performed at base station 320*d* may at least involve generating a new SRv6 message having an SRH which includes a new end marker SID (step 8 of FIG. 6B), and sending the new SRv6 message for receipt by base station 322*d* (step 9*b* of FIG. 6B). In some implementations, the new SRv6 message may be an ICMPv6 message. Base station 322*d* may perform end marker functionality in response to receiving the end marker (step 10 of FIG. 6B). End marker functionality at base station 322*d* may involve at least releasing buffered data packets received from the UPF over the direct path for transmission to the UE (step 11 of FIG. 6B).

FIG. 7A is an illustrative representation of an SRv6 message 730 which includes an end marker segment identifier (SID) 740 (e.g. "End.TME" or "Encapsulation for mapped Tunnel with End Marker"), and FIGS. 7B-7C are illustrative examples of SRv6 functions 710 and 720 corresponding to the end marker SID 740. These examples may be suitable for use in the techniques described above in relation to any of the previous flowcharts and call flows, especially FIGS. 4A, 5A, and partial SRv6 replacement architecture of FIG. 3C.

A basic data format of SRv6 message 730 of FIG. 7A includes an IPv6 header 732 and a payload 736. For SRv6 routing of SRv6 message 730, the data format further includes an SR header 734 or "SRH" (i.e. an extension header for SR as defined by RFC 2460). SRH 734 may include an ordered list of segments which defines a network path along which the SRv6 message 730 will be communicated. SRH 734 may further include the end marker SID 740 associated with end marker handling for GTP (e.g. "End.TME"). Note that end marker SID 740 may include parameters to identify the appropriate X2 path; alternatively, a context identifier may be included as a TLV field in the SRH 734.

Each one of SRv6 functions 710 and 720 of FIGS. 7B and 7C, respectively, is an example of an end marker handling function for GTP (e.g. End.TME). SRv6 function 710 is associated with end marker SID 740 which is a non-routable SID, whereas SRv6 function 720 is for use with a routable SID which precedes a non-routable, end marker SID 740. When using the routable SID along with the non-routable SID, the routable SID may include a predetermined argument to override or bypass its default behavior and activate the function associated with the non-routable SID (i.e. the end marker SID). In some alternative implementations, the existing function "End.TM" (Encapsulation for mapped Tunnel) specified in IETF 1-D, Section 5.4.1, may be updated and used accordingly.

FIG. 8A is an illustrative representation of an SRv6 message 830 which includes end marker SID 840 (e.g. "End.B6E" or "End.B6 with end marker enhancements"), and FIGS. 8B-8C are illustrative examples of SRv6 functions 810 and 820 corresponding to the end marker SID 840. These examples may be suitable for use in the techniques described above in relation to any of the previous flowcharts and call flows, especially FIGS. 4A, 5B, and full SRv6 replacement architecture of FIG. 3D.

A basic data format of SRv6 message 830 of FIG. 8A includes an IPv6 header 832 and a payload 836. For SRv6 routing of SRv6 message 830, the data format further includes an SR header 834 or "SRH" (i.e. the extension header for SR as defined by RFC 2460). SRH 834 may include an ordered list of segments which defines a network path along which the SRv6 message 830 will be communicated. SRH 834 may further include the end marker SID 840 associated with end marker handling for SRv6 (e.g. "End.B6E"). End.B6E may be viewed as an extension to the existing END.B6 function with extended functionality for handling lookups to the UE's mapping on the X2 interface, as well as for generating the appropriate arguments for executing the new function. Note that end marker SID 840 may include parameters to identify the appropriate X2 path; alternatively, a context identifier may be included as a TLV field in the SRH 834.

Each one of SRv6 functions 810 and 820 of FIGS. 8B and 8C, respectively, is an example of an end marker handling function for SRv6 (e.g. End.B6E). SRv6 function 810 is associated with end marker SID 840 which is a non-routable SID, whereas SRv6 function 820 for use with a routable SID which precedes a non-routable, end marker SID 840. When using the routable SID along with the non-routable SID, the routable SID may include a predetermined argument to override or bypass its default behavior and activate the function associated with the non-routable SID (i.e. the end marker SID). In some alternative implementations, "End.B6E" may be realized by extending the existing END.T function, and may be referred to as "End.TE".

Figure 9:
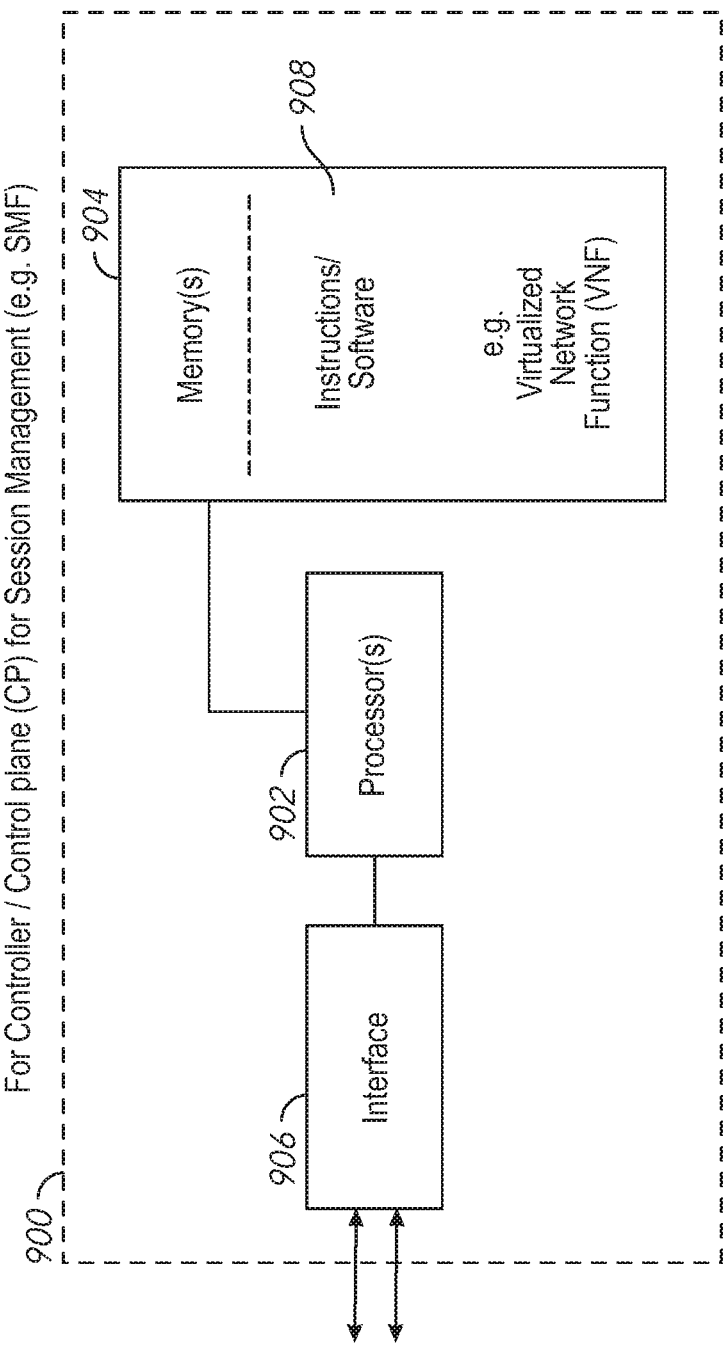
FIG. 9 is a schematic block diagram of basic relevant components of a server, network device, network element, or network equipment for use in a mobile network according to some implementations of the present disclosure.

Reference is now made to FIG. 9, which shows an example of basic relevant components of a server, network device, network element, or network equipment 900 for use in a mobile network according to some implementations of the present disclosure. Such network equipment 900 may be for use, for example, in association with a control plane (CP) entity, such as a CP entity for session management or a session management function (SMF). The components may include one or more processors 902 coupled to one or more memories 904 and to a network interface 906. Interface 906 may be configured to connect to a network for communications. The one or more processors 902 are configured to operate in accordance with program instructions/software 908 (e.g. one or more virtualized network functions (VNFs) or network function virtualizations (NFVs) stored in the one or more memories 904, in order to perform basic operations as well as to perform techniques of the present disclosure. Relatedly, a computer program product may include a non-transitory computer-readable medium (e.g. memory, a computer disk, etc.) and program instructions (e.g. one or more VNFs or NFVs) stored in the non-transitory computer-readable medium such that, when executed by one or more processors 902, may perform the techniques of the present disclosure.

Figure 10:
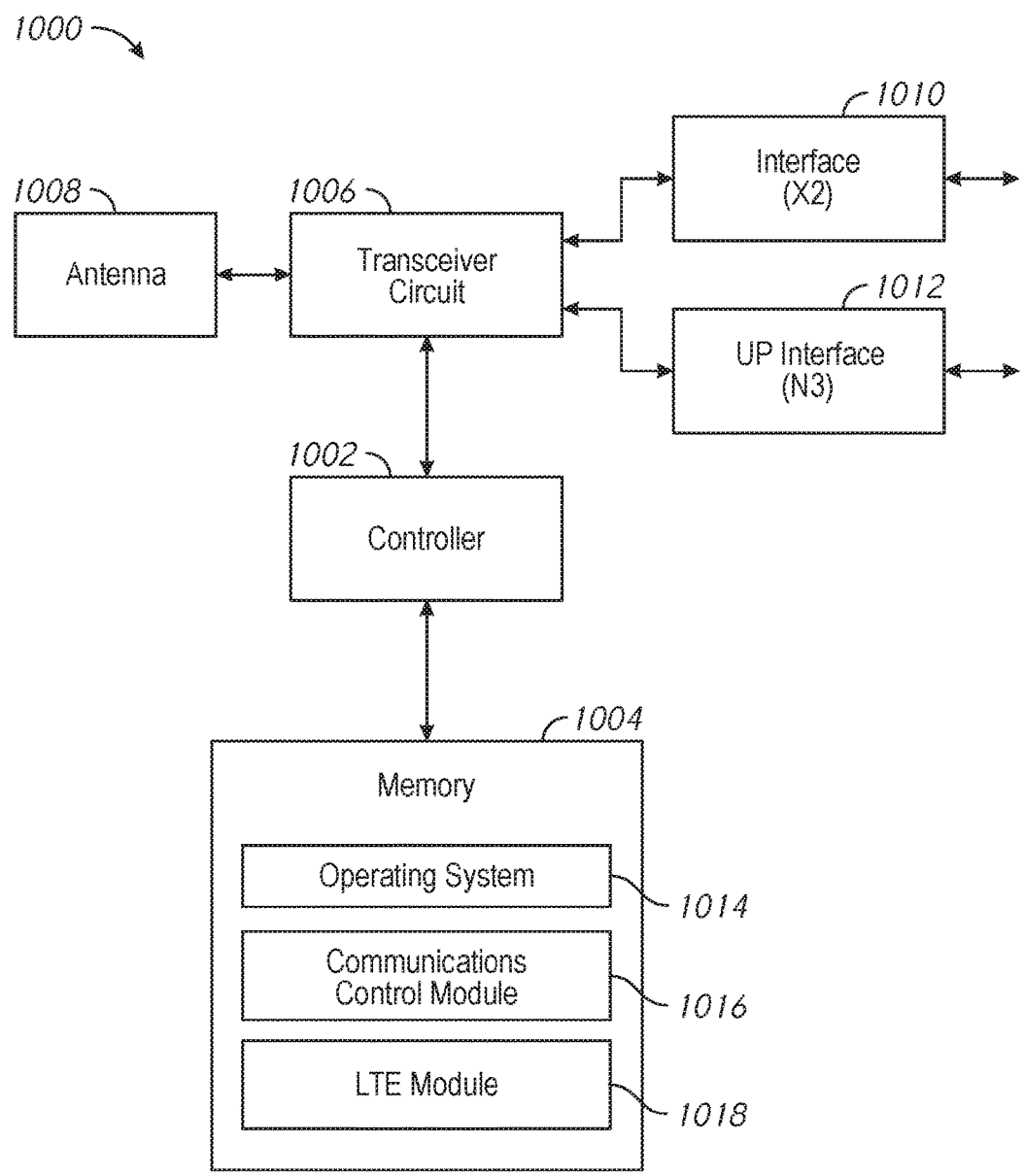
FIG. 10 is a schematic block diagram of basic relevant components of a base station (e.g. an eNodeB or gNodeB) for use in a mobile network according to some implementations of the present disclosure.

Reference is now made to FIG. 10, which shows an example schematic block diagram of basic relevant components of a base station 1000 (e.g. an eNodeB or gNodeB) for use in a mobile network according to some implementations of the present disclosure. As shown, base station 1000 has a transceiver circuit 1006 for transmitting signals to and for receiving signals from the communication devices (such as UEs) via one or more antennas 1008, an interface 1010 (e.g. an X2 interface) for transmitting signals to and for receiving signals from other base stations, and an interface 1012 (e.g. an N3 interface) for transmitting signals to and for receiving signals from a UP entity (such as a UPF). Base station 1000 also has a controller 1002 to control the operation of the base station.

Controller 1002 is associated with a memory 1004. Base station 5 may, of course, have all the typical functionality of a (cellular telephone) network base station, and this may be provided by any one or any combination of hardware, software and firmware, as appropriate. Software may be pre-installed in memory 1004 and/or may be downloaded via the network or from a removable data storage device, for example. Controller 1002 may be configured to control the overall operation of base station 1000 by, in this example, program instructions or software instructions stored within memory 1004. As shown, these software instructions include, among other things, an operating system 1014, a communications control module 1016, an LTE/5G module 1018, and further instructions for use providing the techniques of the present disclosure.

In basic operation, transceiver circuit 1006 is configured to provide wireless communications with UEs. Communications control module 1016 is configured to control the communication between base station 1000 and UEs and other network entities that are connected to base station 1000. Communications control module 1016 also controls the separate flows of downlink user traffic (via associated data radio bearers) and control data to be transmitted to UEs associated with base station 1000 including, for example, control data for core network services and/or mobility of UEs. LTE/5G module 1018 is configured to communicate with compatible communication devices and network nodes using one or more appropriate protocols.

Figure 11:
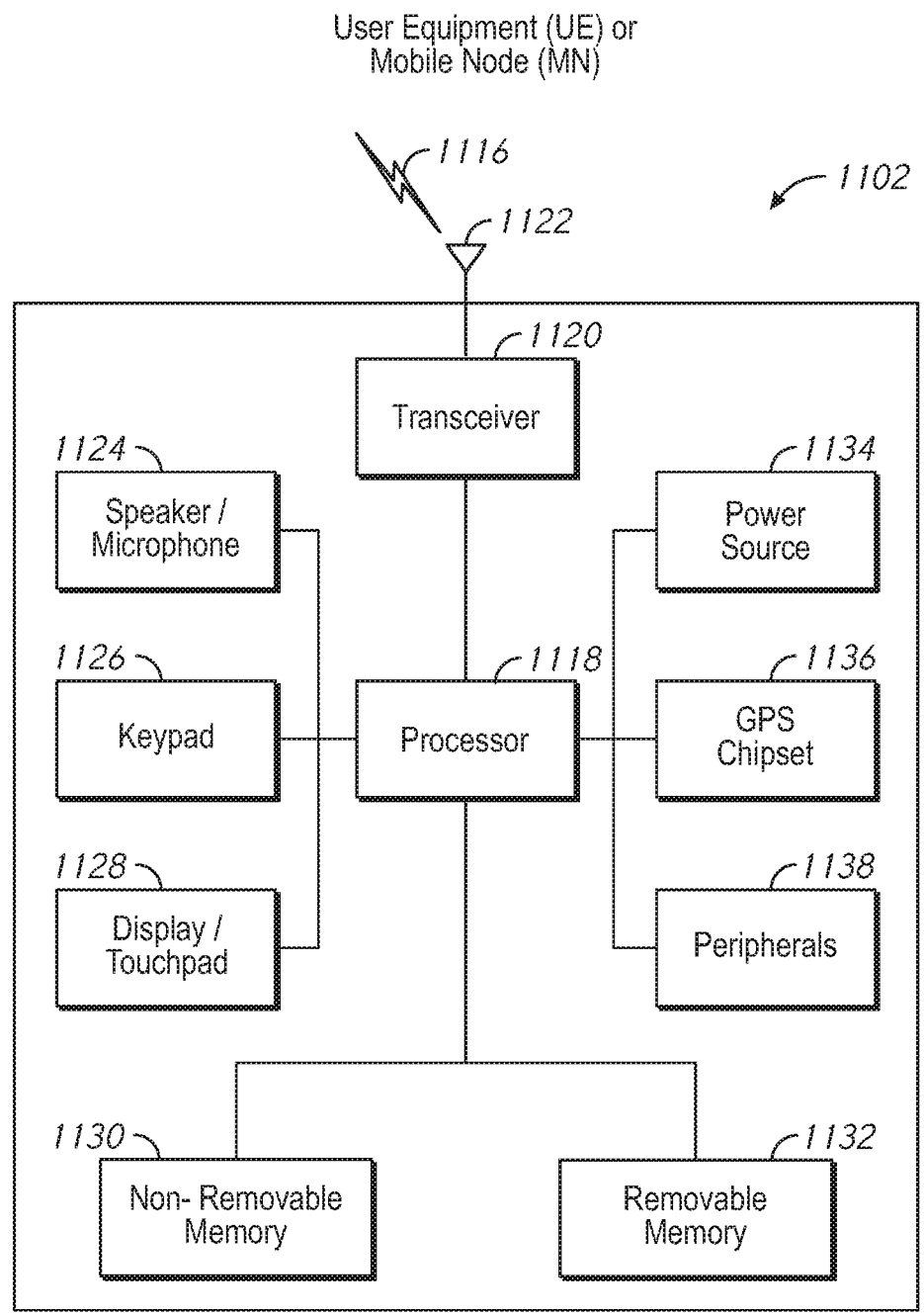
FIG. 11 shows a schematic block diagram of a UE operative in a mobile network according to some implementations of the present disclosure.

Reference is now made to FIG. 11, which shows an example schematic block diagram of a user equipment (UE) 1102 (i.e. the UE 302 of the previous figures) according to some implementations. UE 1102 may be, for example, a user equipment (UE), a cellular telephone, a smart phone, a tablet, a laptop computer, etc. As shown in FIG. 11, UE 1102 may include a processor 1118, a transceiver 1120, a transmit/receive element 1122, a speaker/microphone 1124, a keypad 1126, a display/touchpad 1128, non-removable memory 1106, removable memory 1132, a power source 1134, a global positioning system (GPS) chipset 1136, and other peripherals 1138. It will be appreciated that the UE 1102 may include any sub-combination of the foregoing elements while remaining consistent with an embodiment.

Processor 1118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. Processor 1118 may perform signal coding, data processing, power control, input/output processing, and/or any other functionality that enables UE 1102 to operate in a wireless environment. Processor 1118 may be coupled to transceiver 1120, which may be coupled to the transmit/receive element 1122. While FIG. 11 depicts the processor 1118 and the transceiver 1120 as separate components, it will be appreciated that the processor 1118 and the transceiver 1120 may be integrated together in an electronic package or chip.

Transmit/receive element 1122 may be configured to transmit signals to, or receive signals from, a base station over an air interface 1116. For example, in one embodiment, transmit/receive element 1122 may be an antenna configured to transmit and/or receive RF signals. In another embodiment, transmit/receive element 1122 may be an emitter/detector configured to transmit and/or receive IR, UV, or visible light signals, for example. In yet another embodiment, transmit/receive element 1122 may be configured to transmit and receive both RF and light signals. It will be appreciated that transmit/receive element 1122 may be configured to transmit and/or receive any combination of wireless signals.

In addition, although transmit/receive element 1122 is depicted in FIG. 11 as a single element, UE 1102 may include any number of transmit/receive elements 1122. More specifically, UE 1102 may employ MIMO technology. Thus, in one embodiment, UE 1102 may include two or more transmit/receive elements 1122 (e.g., multiple antennas) for transmitting and receiving wireless signals over air interface 1116.

Transceiver 1120 may be configured to modulate the signals that are to be transmitted by transmit/receive element 1122 and to demodulate the signals that are received by transmit/receive element 1122. As noted above, UE 1102 may have multi-mode capabilities. Thus, transceiver 1120 may include multiple transceivers for enabling UE 1102 to communicate via multiple RATs, such as UTRAN and IEEE 802.11, for example.

Processor 1118 of UE 1102 may be coupled to, and may receive user input data from, speaker/microphone 1124, keypad 1126, and/or display/touchpad 1128 (e.g., a liquid crystal display (LCD) display unit or organic light-emitting diode (OLED) display unit). Processor 1118 may also output user data to speaker/microphone 1124, keypad 1126, and/or display/touchpad 1128. In addition, processor 1118 may access information from, and store data in, any type of suitable memory, such as non-removable memory 1106 and/or removable memory 1132. Non-removable memory 1106 may include random-access memory (RAM), read-only memory (ROM), a hard disk, or any other type of memory storage device. The removable memory 1132 may include a subscriber identity module (SIM) card, a memory stick, a secure digital (SD) memory card, and the like. In other embodiments, processor 1118 may access information from, and store data in, memory that is not physically located on UE 1102, such as on a server or a home computer (not shown).

Processor 1118 may receive power from power source 1134, and may be configured to distribute and/or control the power to the other components in the UE 1102. Power source 1134 may be any suitable device for powering UE 1102. For example, power source 1134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

Processor 1118 may also be coupled to GPS chipset 1136, which may be configured to provide location information (e.g., longitude and latitude) regarding the current location of UE 1102. In addition to, or in lieu of, the information from the GPS chipset 1136, UE 1102 may receive location information over air interface 1116 from a base station and/or determine its location based on the timing of the signals being received from two or more nearby base stations. It will be appreciated that UE 1102 may acquire location information by way of any suitable location-determination method while remaining consistent with an embodiment.

Processor 1118 may further be coupled to other peripherals 1138, which may include one or more software and/or hardware modules that provide additional features, functionality and/or wired or wireless connectivity. For example, peripherals 1138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Note that the components and techniques shown and described in relation to the separate figures may indeed be provided as separate components and techniques, and alternatively one or more (or all of) the components and techniques shown and described in relation to the separate figures are provided together for operation in a cooperative manner.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first message could be termed a second message, and, similarly, a second message could be termed a first message, without changing the meaning of the description, so long as all occurrences of the "first message" are renamed consistently and all occurrences of the "second message" are renamed consistently. The first message and the second messages are both messages, but they are not the same messages.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a base station configured for use in a mobile network, and operative as a source base station for a handover of a user equipment (UE) to a target base station:
receiving an Internet Protocol (IP) message from a user plane (UP) entity which carries data traffic of a data session for the UE; and
performing a function associated with a segment identifier identified in a segment routing header (SRH) of the IP message, the function comprising an end marker handling function associated with the segment identifier.

2. The method of claim 1, wherein the IP message comprises a segment routing (SR) for IP version 6 (IPv6) (SRv6) message, the segment identifier comprises an end marker segment identifier (SID), and the end marker handling function comprises an SRv6 function which is provisioned at the base station.

3. The method of claim 2, wherein the source base station and the target base station communicate with each other in accordance with a General Packet Radio Service (GPRS) tunneling protocol (GTP), and wherein performing the end marker handling function comprises:
generating a tunneling protocol message comprising an end marker message; and
sending the tunneling protocol message comprising the end marker message for receipt by the target base station.

4. The method of claim 3, wherein generating and sending the tunneling protocol message further comprises generating and sending a General Packet Radio Service (GPRS) tunneling protocol (GTP) message comprising the end marker message over a tunnel comprising a GTP tunnel.

5. The method of claim 4, wherein generating the end marker message makes use of a tunnel endpoint identifier (TEID) identified in the SRv6 message.

6. The method of claim 3, wherein the tunneling protocol message comprising the end marker message causes the target base station to release buffered data packets from the UP entity for transmission to the UE.

7. The method of claim 2, wherein the source base station and the target base station communicate with each other in accordance with SRv6, and performing the end marker handling function comprises:
generating a new IP message having a segment routing header which includes a segment identifier associated with a function comprising an end marker message function; and
sending the new IP message for receipt by the target base station.

8. The method of claim 2, wherein the end marker handling function associated with the end marker SID is provisioned at each one of a plurality of base stations which includes the base station.

9. The method of claim 2, wherein the end marker SID comprises a non-routable SID.

10. The method of claim 2, wherein the SRH includes a routable SID which precedes a non-routable SID which comprises the end marker SID.

11. The method of claim 2, further comprising:
when an interface or communications with the target base station comprises a General Packet Radio Service (GPRS) tunneling protocol (GTP), performing the end marker handling function comprising generating a tunneling protocol message comprising an end marker message and sending the tunneling protocol message comprising the end marker message for receipt by the target base station; or when the interface or communications with the target base station comprises an SRv6 protocol, performing the end marker handling function comprising generating a new IP message having a segment routing header which includes a segment identifier associated with a function comprising an end marker message function, and sending the new IP message for receipt by the target base station.

12. The method of claim 1, wherein receiving the IP message from the UP entity comprises receiving the IP message from a user plane function (UPF) configured for segment routing (SR) for IP version 6 (IPv6) (SRv6).

13. A base station, comprising:
a controller;
a transceiver circuit coupled to the controller and configured for wireless communication with a user equipment (UE);
a first interface configured for communication with a user plane (UP) entity assigned to the UE for a data session;
a second interface configured for communication with a target base station in a handover of the UE while the base station operates as a source base station;
the controller being configured to:
receive via the first interface a segment routing (SR) for Internet Protocol version 6 (IPv6) (SRv6) message from the UP entity which carries data traffic of the data session for the UE; and
perform a function associated with a segment identifier (SID) identified in a segment routing header (SRH) of the SRv6 message, the function comprising an end marker handling function associated with the SID.

14. A method, comprising:
at a control plane (CP) entity for session management,
receiving a message indicating a handover of a user equipment (UE) from a source base station to a target base station;
generating an Internet Protocol (IP) message which includes a segment routing header populated with a segment identifier associated with an end marker handling function; and sending the IP message to a user plane (UP) entity assigned to the UE for forwarding to the source base station.

15. The method of claim 14, wherein the IP message comprises a segment routing (SR) for IP version 6 (IPv6) (SRv6) message, the segment identifier comprises an end marker segment identifier (SID), and the end marker handling function comprises an SRv6 function which is provisioned at the base station.

16. The method of claim 15, wherein sending the IP message to the UP entity is for forwarding to the source base station as an instruction to perform the end marker handling function which is provisioned at the source base station.

17. The method of claim 15, further comprising:
when an interface or communication between the source and the target base stations comprises a General Packet Radio Service (GPRS) tunneling protocol (GTP), populating the IP message with a first end marker segment identifier associated with a first end marker handling function; and
when the interface or communication between the source and the target base stations comprises an SRv6 protocol, populating the IP message with a second end marker segment identifier associated with a second end marker handling function.

18. The method of claim 15, further comprising:
populating the IP message with a tunnel endpoint identifier (TEID) associated with the UE.

19. The method of claim 15, wherein the end marker handling function for use at the source base station comprises:
generating a tunneling protocol message comprising an end marker message; and
sending the tunneling protocol message comprising the end marker message for receipt by the target base station.

20. The method of claim 15, wherein the end marker handling function for use at the source base station comprises:
generating a new IP message having a segment routing header which includes a segment identifier associated with a function comprising an end marker message function; and
sending the new IP message for receipt by the target base station.

* * * * *